United States Patent
Oki et al.

(10) Patent No.: US 7,279,034 B2
(45) Date of Patent: *Oct. 9, 2007

(54) INK COMPOSITION, INK CARTRIDGE, INKJET RECORDING METHOD, AND RECORDED MATTER

(75) Inventors: Yasuhiro Oki, Nagano-ken (JP); Kazuhiko Kitamura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 11/311,869

(22) Filed: Dec. 19, 2005

(65) Prior Publication Data

US 2006/0203059 A1    Sep. 14, 2006

(30) Foreign Application Priority Data

Mar. 11, 2005  (JP)  ............... 2005-068732
Mar. 11, 2005  (JP)  ............... 2005-068738

(51) Int. Cl.
C09D 11/00    (2006.01)
C09D 11/02    (2006.01)
B41J 2/01     (2006.01)

(52) U.S. Cl. ............... 106/31.58; 106/31.46; 106/31.47; 106/31.49; 106/31.59; 347/100

(58) Field of Classification Search ............ 106/31.58, 106/31.49, 31.59, 31.46, 31.47; 347/100
See application file for complete search history.

(56) References Cited

U.S. PATENT DOCUMENTS 4,163,675 A * 8/1979 Hirano et al. ............ 106/31.43

5,478,383 A * 12/1995 Nagashima et al. ...... 106/31.43

(Continued)

FOREIGN PATENT DOCUMENTS

EP    0 985 716    3/2000

(Continued)

OTHER PUBLICATIONS

English Abstract of WO99/50363 dated Oct. 7, 1999.

(Continued)

*Primary Examiner*—Helene Klemanski
(74) *Attorney, Agent, or Firm*—Ladas & Parry LLP

(57) ABSTRACT

It is an object of the present invention to provide an ink composition with which the indoor storage stability (gas resistance) of an image produced with an ink composition featuring a phthalocyanine-based cyan dye can be increased without causing any additive precipitation or bronzing. The present invention provides an ink composition containing at least water, a phthalocyanine-based cyan dye, and a lithium salt of an aromatic compound having a sulfo group and expressed by General Formulas 1 and/or 2 in the claims. The present invention also provides an ink composition containing at least water, a phthalocyanine-based cyan dye, and a lithium salt of an aromatic compound having a sulfo group and expressed by General Formulas 5 and/or 6 in the claims. The present invention further provides an ink composition containing at least water, a phthalocyanine-based cyan dye, and a lithium salt of an aromatic compound having a sulfo group and expressed by General Formulas 1 and/or 2 in the claims or a lithium salt of an aromatic compound having a sulfo group and expressed by General Formulas 5 and/or 6 in the claims, wherein the phthalocyanine-based cyan dye is expressed by Formula 3 in the claims.

43 Claims, 2 Drawing Sheets

U.S. PATENT DOCUMENTS

| | | | |
|---|---|---|---|
| 6,319,309 B1 * | 11/2001 | Lavery et al. | 106/31.27 |
| 6,379,441 B1 * | 4/2002 | Kanaya et al. | 106/31.49 |
| 7,083,669 B2 * | 8/2006 | Fukumoto et al. | 106/31.49 |
| 2005/0183630 A1 * | 8/2005 | Oki et al. | 106/31.49 |
| 2006/0135646 A1 * | 6/2006 | Oki et al. | 523/160 |
| 2006/0203059 A1 * | 9/2006 | Oki et al. | 347/100 |
| 2006/0233976 A1 * | 10/2006 | Uhlir-Tsang et al. | 428/32.34 |

FOREIGN PATENT DOCUMENTS

| | | |
|---|---|---|
| EP | 1 088 864 | 4/2001 |
| EP | 1 577 355 | 9/2005 |
| JP | 2002-249677 | 9/2002 |
| JP | 2003-213167 | 7/2003 |
| JP | 2003-213168 | 7/2003 |
| JP | 2003-341633 | 12/2003 |
| JP | 2004-2670 | 1/2004 |
| JP | 2004-31869 | 1/2004 |
| WO | 99/50363 | 10/1999 |

OTHER PUBLICATIONS

Patent Abstracts of Japan and JPO computer English translation of JP 2003-341633 dated Dec. 3, 2003.

Patent Abstracts of Japan and JPO computer English translation of JP 2004-31869 dated Jan. 29, 2004.

Patent Abstracts of Japan and JPO computer English translation of JP 2002-249677 dated Sep. 6, 2002.

Patent Abstracts of Japan and JPO computer English translation of JP 2003-213167 dated Jul. 30, 2003.

Patent Abstracts of Japan and JPO computer English translation of JP 2003-213168 dated Jul. 30, 2003.

Patent Abstracts of Japan and JPO computer English translation of JP 2004-2670 dated Jan. 8, 2004.

* cited by examiner

INK COMPOSITION, INK CARTRIDGE, INKJET RECORDING METHOD, AND RECORDED MATTER

CROSS-REFERENCE TO RELATED APPLICATION

This application relates to and claims priority from Japanese Patent Application No. 2005-068732, filed on Mar. 11, 2005, and Japanese Patent Application No. 2005-068738, filed on Mar. 11, 2005, the entire disclosure of which are incorporated herein by reference.

BACKGROUND

The present invention relates to an ink composition with which the indoor storage stability (gas resistance) of an image produced from the composition can be increased, and more particularly relates to a phthalocyanine-based cyan dye-containing ink composition with which color fading of an image can be effectively prevented.

Ink compositions featuring a phthalocyanine-based cyan dye have been widely used in the past as ink compositions for producing images with excellent cyan color and so forth. Also, it has now become very popular to form images by using an ink composition that produces such a colored image along with one or more ink compositions that produce other colors, and to display the resulting images composed of a plurality of colors (color images) indoors and elsewhere.

However, with an ink composition made with a phthalocyanine-based cyan dye, because phthalocyanine-based cyan dyes have poor resistance to oxidative gases such as ozone, sulfur oxides, and nitrogen oxides that are present in the air, and particularly poor ozone resistance, when a multicolor image is formed using this cyan dye along with ink compositions of other colors, and this image is displayed indoors, the image formed from the cyan dye fades faster than the images of other colors.

Various ink compositions have been developed in an effort to prevent this color facing of phthalocyanine. For instance, WO99/50363 discloses as a means for increasing light fastness a cyan ink composition containing a copper phthalocyanine-based cyan dye, an imidazole derivative, and either an antioxidant, a saccharide, or naphthalene-1-sulfonic acid having an amino group or a hydroxyl group in the 4-position. With this ink composition, however, its resistance to ozone gas has not been evaluated, and the molecules of the components used in the composition include hydroxyl groups and amino groups, which cause the image to turn green or black as a result of nitrogen oxides (NOx gas).

The inventors conducted diligent research into these problems, and as a result found that the ozone resistance of a recorded image can be effectively increased, without the image changing color or fading as a result of nitrogen oxides, by adding a specific aromatic sulfonic acid and/or a salt thereof to an ink composition in which a phthalocyanine-based cyan dye is used (Japanese Patent Applications 2003-341633 and 2004-31869). However, further research has revealed that the additives in an ink composition to which these additives have been added sometimes precipitate on the surface of the image when the recorded image is stored at room temperature for an extended period. This was seen, for example, when a sodium salt or potassium salt of this aromatic compound was used, such as a disodium salt of naphthalene-1,5-disulfonic acid. This precipitation of additives was not seen when the aromatic sulfonate was contained in a small amount in the ink, but the problem was that the ozone resistance decreased as the additive amount was reduced.

Furthermore, bronzing was sometimes noted when an image was printed in an environment of high temperature and humidity. Here again, no bronzing was seen when the aromatic sulfonate was contained in a small amount in the ink, but the problem was that the ozone resistance decreased as the additive amount was reduced.

Therefore, it is an object of the present invention to provide an ink composition with which the indoor storage stability (gas resistance) of an image produced with an ink composition featuring a phthalocyanine-based cyan dye can be increased without causing any additive precipitation or bronzing.

As a result of diligent research, the inventors discovered that the stated object could be achieved by an ink composition containing a specific phthalocyanine-based cyan dye along with other specific components.

SUMMARY

The present invention was conceived on the basis of this discovery, and provides the following invention.

An ink composition containing at least water, a phthalocyanine-based cyan dye, and a lithium salt of an aromatic compound having a sulfo group and expressed by the following General Formulas 1 and/or 2:

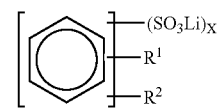

(1)

(where X is an integer of at least 1, $R^1$ and $R^2$ are each a hydrogen atom, a $C_1$ to $C_6$ alkyl group, or a $C_1$ to $C_6$ alkoxy group, and $R^1$ and $R^2$ may be the same or different)

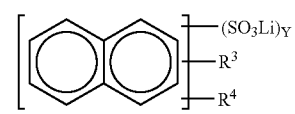

(2)

(where Y is an integer of at least 1, $R^3$ and $R^4$ are each a hydrogen atom, a $C_1$ to $C_6$ alkyl group, or a $C_1$ to $C_6$ alkoxy group, and $R^3$ and $R^4$ may be the same or different).

The present invention also provides the following invention.

An ink composition containing at least water, a phthalocyanine-based cyan dye, and an aromatic compound having a sulfo group and expressed by the following General Formulas 5 and/or 6, and/or a salt of said aromatic compound:

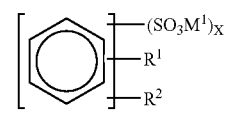

(5)

(where $M^1$ is a hydrogen atom or a counter ion that constitutes a salt, X is an integer of at least 3, $R^1$ and $R^2$ are each a hydrogen atom, a $C_1$ to $C_6$ alkyl group, or a $C_1$ to $C_6$ alkoxy group, and $R^1$ and $R^2$ may be the same or different)

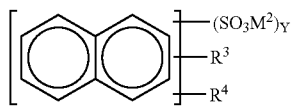
(6)

(where $M^2$ is a hydrogen atom or a counter ion that constitutes a salt, Y is an integer of at least 3, $R^3$ and $R^4$ are each a hydrogen atom, a $C_1$ to $C_6$ alkyl group, or a $C_1$ to $C_6$ alkoxy group, and $R^3$ and $R^4$ may be the same or different).

The present invention also provides the following invention.

An ink composition containing at least water, a phthalocyanine-based cyan dye, and a lithium salt of an aromatic compound having a sulfo group and expressed by the following General Formulas 1 and/or 2, wherein the phthalocyanine-based cyan dye is expressed by the following Formula 3:

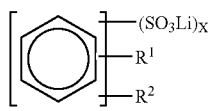
(1)

(where X is an integer of at least 1, $R^1$ and $R^2$ are each a hydrogen atom, a $C_1$ to $C_6$ alkyl group, or a $C_1$ to $C_6$ alkoxy group, and $R^1$ and $R^2$ may be the same or different)

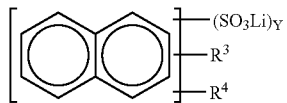
(2)

(where Y is an integer of at least 1, $R^3$ and $R^4$ are each a hydrogen atom, a $C_1$ to $C_6$ alkyl group, or a $C_1$ to $C_6$ alkoxy group, and $R^3$ and $R^4$ may be the same or different).

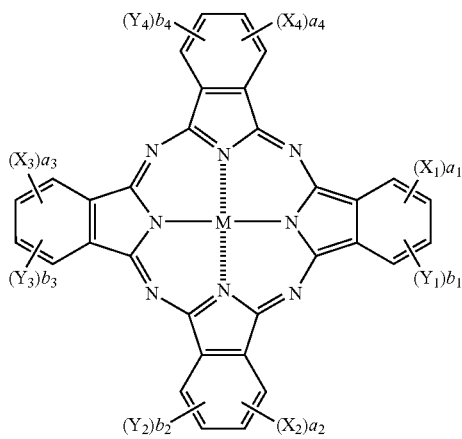
(3)

(where $X_1$, $X_2$, $X_3$, and $X_4$ are each independently —SO-Z or —SO$_2$-Z; each Z here is independently a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group, $Y_1$, $Y_2$, $Y_3$, and $Y_4$ are each independently a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureido group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, or ionic hydrophilic group, where each of these groups may have a substituent, $a_1$ to $a_4$ and $b_1$ to $b_4$ are the number of substituents of $X_1$ to $X_4$ and $Y_1$ to $Y_4$, respectively, $a_1$ to $a_4$ are each independently an integer from 0 to 4, but all cannot be 0 at the same time, and $b_1$ to $b_4$ are each independently an integer from 0 to 4, M is a hydrogen atom or a metal element or an oxide, hydroxide, or halide thereof, and at least one of $X_1$, $X_2$, $X_3$, $X_4$, $Y_1$, $Y_2$, $Y_3$, and $Y_4$ is an ionic hydrophilic group or a group that has an ionic hydrophilic group as a substituent).

The present invention also provides the following invention.

An ink composition containing at least water, a phthalocyanine-based cyan dye, and an aromatic compound having a sulfo group and expressed by the following General Formulas 5 and/or 6, and/or a salt of said aromatic compound, wherein the phthalocyanine-based cyan dye is expressed by the following Formula 3:

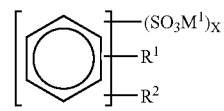
(5)

(where $M^1$ is a hydrogen atom or a counter ion that constitutes a salt, X is an integer of at least 3, $R^1$ and $R^2$ are each a hydrogen atom, a $C_1$ to $C_6$ alkyl group, or a $C_1$ to $C_6$ alkoxy group, and $R^1$ and $R^2$ may be the same or different)

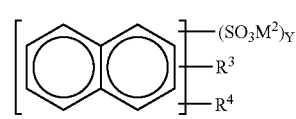
(6)

(where $M^2$ is a hydrogen atom or a counter ion that constitutes a salt, Y is an integer of at least 3, $R^3$ and $R^4$ are each a hydrogen atom, a $C_1$ to $C_6$ alkyl group, or a $C_1$ to $C_6$ alkoxy group, and $R^3$ and $R^4$ may be the same or different).

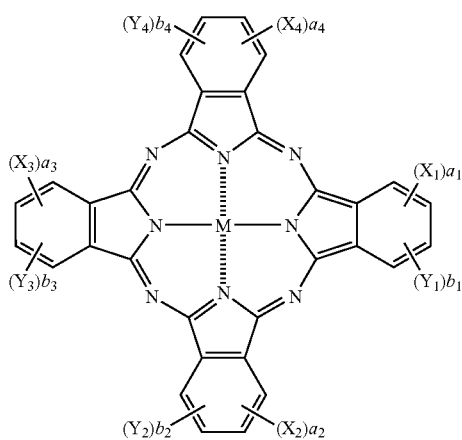

(where $X_1$, $X_2$, $X_3$, and $X_4$ are each independently —SO-Z or —SO$_2$-Z; each Z here is independently a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group, $Y_1$, $Y_2$, $Y_3$, and $Y_4$ are each independently a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureido group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, or ionic hydrophilic group, where each of these groups may have a substituent, $a_1$ to $a_4$ and $b_1$ to $b_4$ are the number of substituents of $X_1$ to $X_4$ and $Y_1$ to $Y_4$, respectively, $a_1$ to $a_4$ are each independently an integer from 0 to 4, but all cannot be 0 at the same time, and $b_1$ to $b_4$ are each independently an integer from 0 to 4, M is a hydrogen atom or a metal element or an oxide, hydroxide, or halide thereof, and at least one of $X_1$, $X_2$, $X_3$, $X_4$, $Y_1$, $Y_2$, $Y_3$, and $Y_4$ is an ionic hydrophilic group or a group that has an ionic hydrophilic group as a substituent).

The present invention also provides the following inventions.

An ink cartridge, comprising at least the above-mentioned ink composition.

An inkjet recording method for recording by discharging droplets of an ink composition and causing said droplets to adhere to a recording medium, wherein said inkjet recording method involves the use of the above-mentioned ink composition.

A recorded matter, which is recorded using the above-mentioned ink composition.

The ink composition of the present invention exhibits an excellent effect in that it allows the indoor storage stability (gas resistance) of the resulting image to be increased without causing any additive precipitation or bronzing.

DETAILED DESCRIPTION

Figure 1:
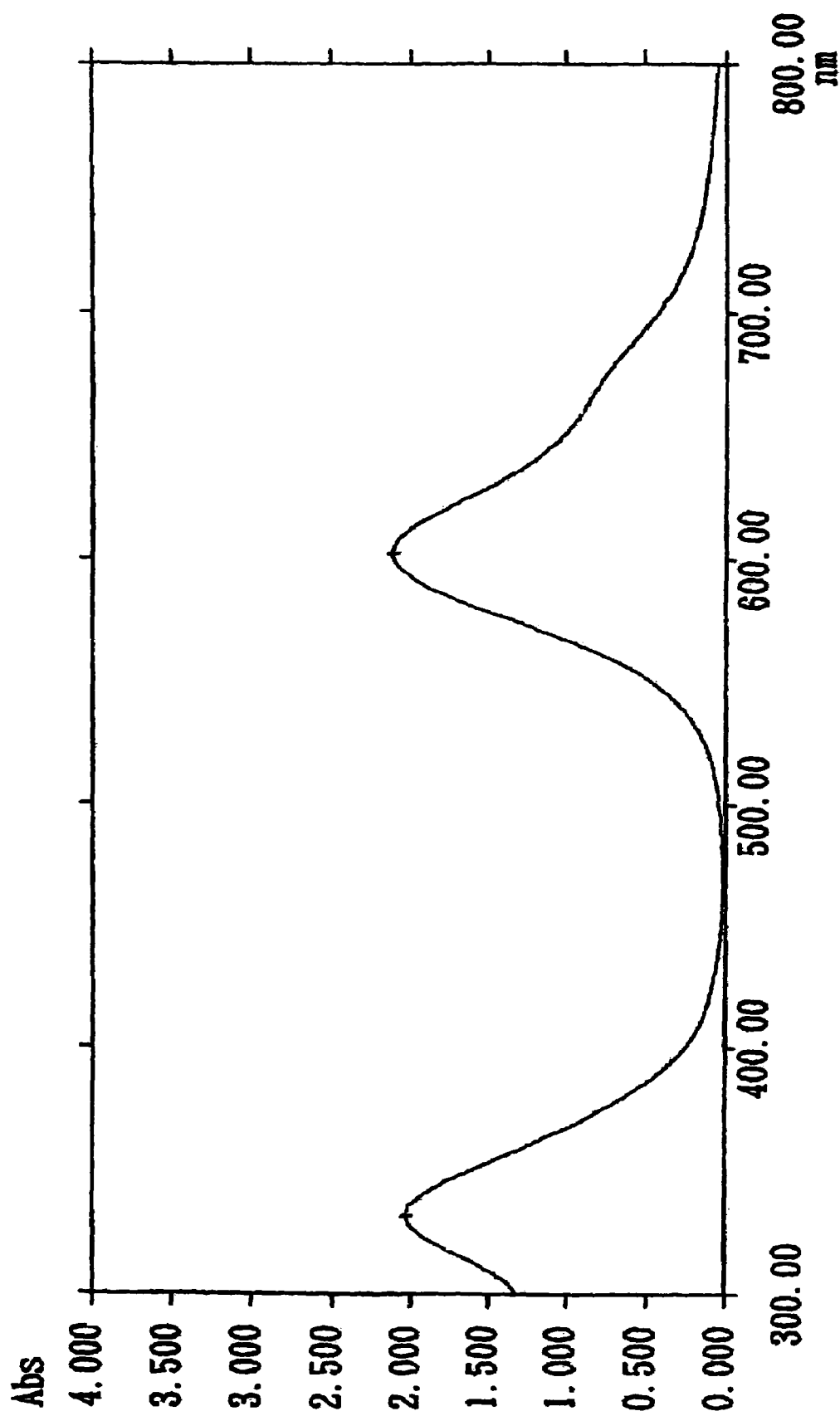
FIG. 1 is a graph of the spectral characteristics (absorption wavelengths) of the dye (C.I. Direct Blue 199; *1) contained in the ink composition in a first preferred embodiment of the present invention.
Figure 2:
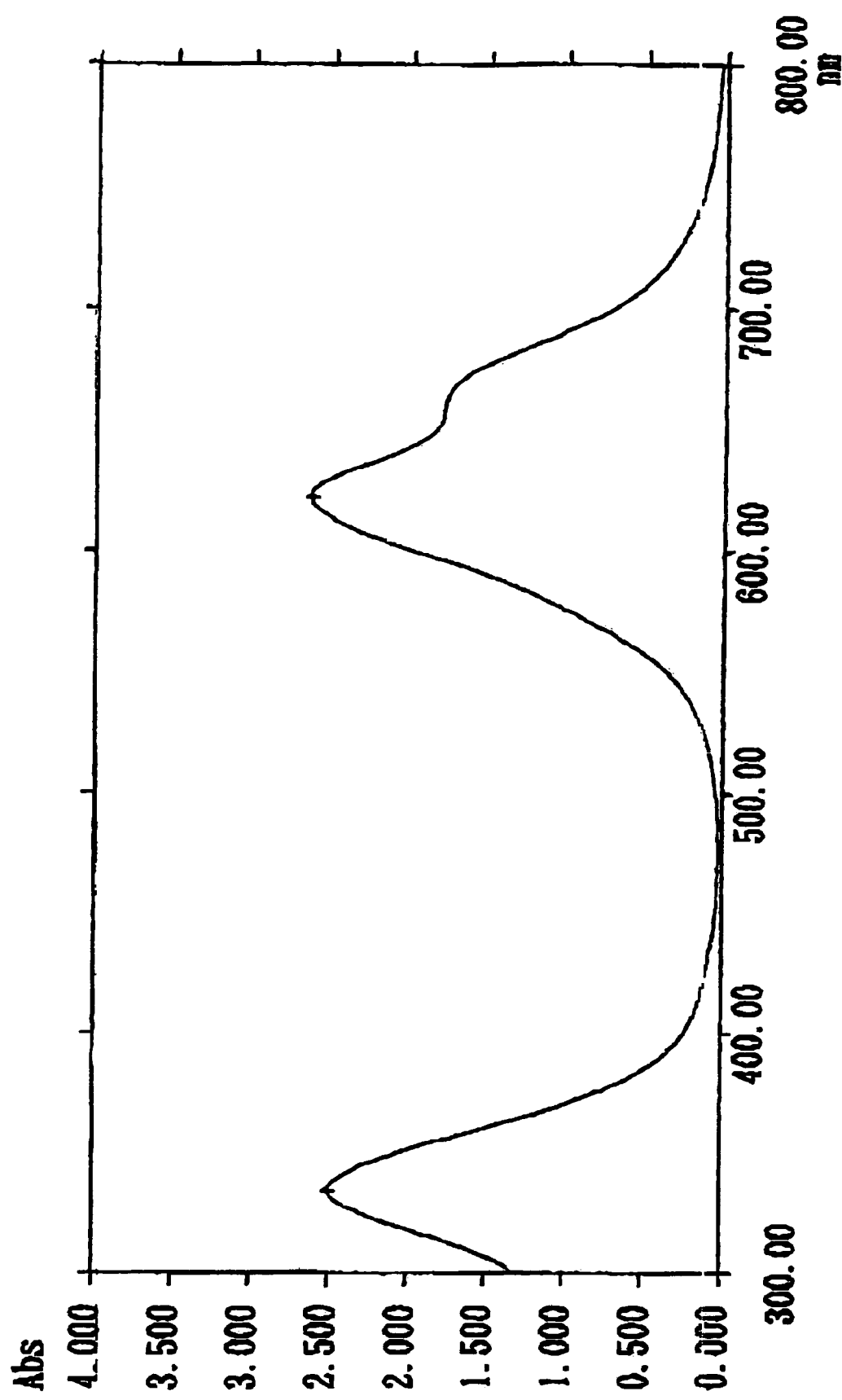
FIG. 2 is a graph of the spectral characteristics (absorption wavelengths) of the dye (C.I. Direct Blue 86; *4) contained in the ink composition in a second preferred embodiment of the present invention.

The present invention will now be described in detail through reference to preferred embodiments thereof.

First Embodiment

The ink composition of the first embodiment pertaining to the present invention is characterized by containing at least water, a phthalocyanine-based cyan dye, and a lithium salt of an aromatic compound having a sulfo group and expressed by the following General Formulas 1 and/or 2:

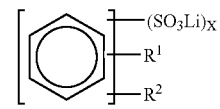

(where X is an integer of at least 1, $R^1$ and $R^2$ are each a hydrogen atom, a $C_1$ to $C_6$ alkyl group, or a $C_1$ to $C_6$ alkoxy group, and $R^1$ and $R^2$ may be the same or different)

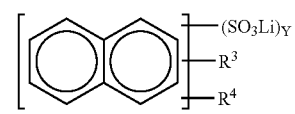

(where Y is an integer of at least 1, $R^3$ and $R^4$ are each a hydrogen atom, a $C_1$ to $C_6$ alkyl group, or a $C_1$ to $C_6$ alkoxy group, and $R^3$ and $R^4$ may be the same or different).

Because the ink composition of the first embodiment is constituted as above, there are no problems such as additive precipitation or bronzing, and early fading of cyan images can be effectively prevented. This in turn makes it possible for the quality of images produced from this ink composition to be maintained at a good level over an extended period.

The ink composition of the first embodiment contains, in water or an aqueous medium composed of water and a water-soluble organic solvent, at least a phthalocyanine-based cyan dye, and a lithium salt of an aromatic compound having a sulfo group and expressed by General Formulas 1 and/or 2, but can also contain a humectant, viscosity regulator, pH regulator, and other such additives as needed.

There are no particular restrictions on the cyan dye used in the ink composition of the first embodiment as long as it is a phthalocyanine-based cyan dye, but the improvement effect will be particularly good when a copper phthalocyanine dye is used.

Favorable examples of copper phthalocyanine dyes include dyes expressed by the following Formula 0:

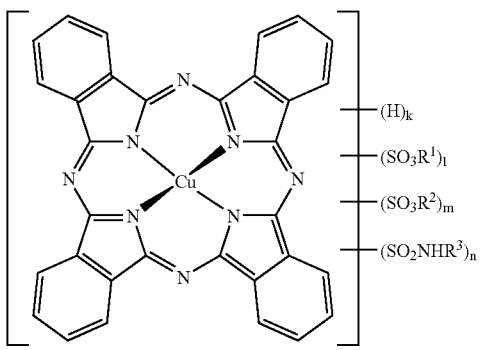

(0)

(where $R^1$ is a hydrogen, alkali metal, or $-NH_4$, $R^2$ is an alkali metal or $-NH_4$, $R^3$ is a hydrogen, an alkyl group that may be substituted, or an aryl group that may be substituted, k, l, and n are each 0 to 3, m is a natural number from 1 to 4, and k+l+m+n=4).

A cyan dye that can be used favorably in the ink composition of this embodiment, that is, a copper phthalocyanine-based cyan dye expressed by the above-mentioned formula 0, will now be described in detail.

Examples of the above-mentioned copper phthalocyanine-based cyan dyes include C.I. Direct Blue 86, 87 and 199, with which an especially marked improvement effect is obtained.

These dyes can be used alone or in combinations, and can also be used along with other dyes besides those listed above.

In terms of increasing ozone resistance, it is preferable for the phthalocyanine-based cyan dye to be a dye in which the absorption spectrum in the visible band (400 to 800 nm) has a maximum absorption peak at a wavelength of 590 to 650 nm, with a range of 590 to 615 nm being particularly good, and 590 to 605 nm being even better.

Particularly when the phthalocyanine-based cyan dye has a sulfo group that is an ionic hydrophilic group, such as $SO^3R^1$ or $SO_3R^2$ in Formula 0, it is preferable in terms of suppressing bronzing in the printed image for $R^1$ and $R^2$ to be a lithium ion.

The amount in which the phthalocyanine-based cyan dye is contained is suitably determined according to the type of dye, the type of solvent component, and so forth, but is preferably from 0.1 to 10 wt %, and even more preferably 0.5 to 5 wt %, with respect to the total amount of the ink composition. Keeping this amount to 0.1 wt % or higher ensures satisfactory image density and coloration on the recording medium, and keeping the amount to 10 wt % or less makes it easier to regulate the viscosity of the ink composition and allows good discharge reliability, clogging resistance, and other such characteristics to be achieved more easily.

The ink composition of this embodiment contains at least one type of lithium salt of an aromatic compound having a specific sulfo group, in order to suppress the color change and fading seen when printing with an ink composition containing the above-mentioned phthalocyanine-based cyan dye (and which is caused by poor gas resistance, and particularly ozone resistance, on the part of the phthalocyanine-based cyan dye).

In this embodiment, this lithium salt of an aromatic compound having a specific sulfo group is used in combination with the above-mentioned phthalocyanine-based cyan dye, the result being that color change and fading in images caused by ozone gas are suppressed, and the fading resistance of an image is greatly enhanced, without causing any additive precipitation or bronzing.

The ink composition of this embodiment contains at least one type of lithium salt of an aromatic compound having a sulfo group and expressed by the following General Formulas 1 and/or 2, in order to alleviate or eliminate the color change and fading seen when printing with an ink composition containing the above-mentioned phthalocyanine-based cyan dye (and which seems to be caused by poor gas resistance, and particularly ozone resistance, on the part of the phthalocyanine-based cyan dye), without causing any additive precipitation or bronzing.

Exactly how the ink composition of this embodiment works is not clear, but it is believed that when a lithium salt of an aromatic compound having one or more sulfo groups is selectively used so that said compound will be expressed by the above-mentioned General Formulas 1 and/or 2, the water solubility of said aromatic compound is increased, and as a result, this prevents or suppresses the bronzing of a printed image and the precipitation of said aromatic compound onto the surface of the recording medium. This makes it possible to improve the gas resistance, and particularly the ozone resistance, of printed matter without incurring any problems.

With this embodiment, a lithium salt of an aromatic compound having a sulfo group and expressed by General Formulas 1 and/or 2 is used in combination with a phthalocyanine-based cyan dye, which markedly improves image fading resistance and suppresses color change and fading of an image caused by ozone gas, without causing any greening or blackening as a result of NOx gas, and also without causing any additive precipitation or bronzing.

Also, with this embodiment, if the ink composition contains water, a phthalocyanine-based cyan dye, and at least one type of lithium salt of an aromatic compound having a sulfo group, then the color change and fading seen in solid printing can be effectively prevented not only with a cyan ink composition, but also with ink compositions of different colors other than cyan, such as a black ink composition. Other conventional dyes can be used concurrently in order to produce these types of ink composition.

The lithium salt of an aromatic compound having a sulfo group and expressed by General Formulas 1 and/or 2 can be any lithium salt of an aromatic compound having at least one sulfo group in its molecular structure, but in terms of improving the ozone resistance, additive precipitation suppression, and bronzing suppression in the obtained image, it is preferable for this compound to have at least two sulfo groups, and particularly to be at least one type selected from the group consisting of lithium salts of 1,3-benzenedisulfonic acid, napthalene-1,5-disulfonic acid, napthalene-1,6-disulfonic acid, napthalene-2,6-disulfonic acid, napthalene-2,7-disulfonic acid, and napthalene-1,3,6-trisulfonic acid.

The lithium salt of an aromatic compound having a sulfo group can be added to the ink composition in the form of a salt, or the aromatic compound having a sulfo group and a base that can be used to form a lithium salt can be added separately to the ink composition.

The amount in which the lithium salt of an aromatic compound having a sulfo group is contained is suitably determined according to the type of lithium salt of an aromatic compound having a sulfo group, the type of dye, the type of solvent component, and so forth, but is preferably from 0.1 to 10 wt %, and even more preferably 0.5 to 10 wt %, with respect to the total amount of the ink composition.

In terms of effectively increasing gas resistance and ensuring good ink reliability, it is preferable if the phthalocyanine-based cyan dye and the lithium salt of an aromatic compound having a sulfo group are contained in the ink composition of this embodiment in a ratio (former:latter) of 1:0.1 to 1:10, with a range of 1:0.2 to 1:5 being particularly favorable.

For the amounts of phthalocyanine-based cyan dye and lithium salt of an aromatic compound having a sulfo group to be stably dissolved, the pH (20° C.) of the ink composition is preferably at least 8.0. When material resistance with the various members that come into contact with the ink composition is taken into account, the pH of the ink composition is preferably 10.5 or lower. To strike a good balance between these considerations, the pH of the ink composition is preferably adjusted to between 8.0 and 10.5, with a range of 8.5 to 10.0 being even better.

The ink composition of the present invention can also contain a humectant selected from among saccharides and/or water-soluble organic solvents whose evaporation pressure is lower than that of pure water.

Adding a humectant suppresses water evaporation and keeps the ink moist in an inkjet printing process. Also, using a water-soluble organic solvent improves discharge stability, and allows the viscosity of the ink to be varied easily, without changing the ink characteristics. "Water-soluble organic solvent" as used here refers to a medium-capable of dissolving a solute, and is selected from among solvents that are organic and water-soluble and have an evaporation pressure lower than that of pure water. Specific favorable examples include ethylene glycol, propylene glycol, butanediol, pentanediol, 2-butene-1,4-diol, 2,-methyl-2,4-pentanediol, glycerol, 1,2,6-hexanetriol, diethylene glycol, triethylene glycol, dipropylene glycol, and other such polyhydric alcohols; acetonylacetone and other such ketones; gamma-butyrolactone, triethyl phosphate, and other such esters; furfuryl alcohol, tetrahydrofurfuryl alcohol, and thiodiglycol.

Favorable saccharides include maltitol, sorbitol, gluconolactone, and maltose.

The humectant is preferably added in an amount of 5 to 50 wt %, and even more preferably 5 to 30 wt %, and especially 5 to 20 wt %, with respect to the total amount of the ink composition. Moisture retention properties will be achieved if the amount is at least 5 wt %, and the ink can be easily adjusted to the proper viscosity for use in inkjet recording if the amount is no more than 50 wt %.

The ink composition of this embodiment also preferably contains a nitrogen-containing organic solvent. Examples of nitrogen-containing organic solvents include 1,3-dimethyl-2-imidazolidinone, 2-pyrrolidone, N-methyl-2-pyrrolidone, and epsilon-caprolactam. Of these, the use of 2-pyrrolidone is preferred. These solvents can be used singly or in combinations of two or more types.

The content thereof is preferably from 0.5 to 10 wt %, and even more preferably 1 to 5 wt %. Setting this content to at least 0.5 wt % allows the solubility of the colorants in the present invention to be increased, and setting the content to 10 wt % or less prevents a decrease in the material resistance with the various members that come into contact with the ink composition.

The ink composition of this embodiment also preferably includes a nonionic surfactant as an additive that affords faster fixing (penetration) of the ink and at the same is effective at maintaining the circularity of dots.

An acetylene glycol-based surfactant is an example of nonionic surfactants that can be used in this embodiment. Specific examples of acetylene glycol-based surfactants include Surfynol 465 and Surfynol 104 (both made by Air Products and Chemicals, Inc.), and Olfine E1010, Olfine PD001, and Olfine STG (all made by Nissin Chemical Industry Co., Ltd.; trademarks). The added amount thereof is preferably 0.1 to 5 wt %, and even more preferably 0.5 to 2 wt %. Keeping the added amount to 0.1 wt % or more allows adequate penetrability to be obtained, and keeping the amount to 5 wt % or less makes it easier to prevent image bleed.

In terms of increasing penetrability, the ink composition of this embodiment preferably further includes a penetration enhancer. The addition of a glycol ether as a penetration enhancer further increases penetrability and also reduces bleeding at the boundary between adjacent colored inks when color printing is performed, and allows an extremely sharp image to be obtained.

Examples of glycol ethers include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, and triethylene glycol monobutyl ether. The added amount thereof is from 3 to 30 wt %, and preferably 5 to 15 wt %. If the added amount is less than 3 wt %, an anti-bleed effect may not be obtained, but if 30 wt % is exceeded, not only will there be image bleed, but oily separation will occur, making it necessary to use dissolution auxiliaries of these glycol ethers, and this will raise the viscosity of the ink and impair discharge from an inkjet head.

In addition, the ink composition of this embodiment may contain, as needed, triethanolamine, a hydroxide of an alkali metal, or another such pH regulator, urea or a derivative thereof or another such hydrotropic agent, sodium alginate or another such water-soluble polymer, a water-soluble resin, a fluorine-based surfactant, a mildew inhibitor, a rustproofing agent, a preservative, or the like.

An example of how the ink composition of this embodiment is prepared is a method in which the components are thoroughly mixed and dissolved, this solution is filtered under pressure through a membrane filter with a pore diameter of 0.8 μm, and the filtrate is then deaerated with a vacuum pump.

Second Embodiment

The ink composition pertaining to a second embodiment of the present invention is characterized by containing at least water, a phthalocyanine-based cyan dye, and an aromatic compound having a sulfo group and expressed by the following General Formulas 5 and/or 6, and/or a salt of said aromatic compound:

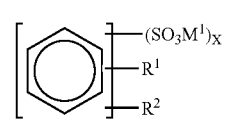

(5)

(where $M^1$ is a hydrogen atom or a counter ion that constitutes a salt, X is an integer of at least 3, $R^1$ and $R^2$ are each a hydrogen atom, a $C_1$ to $C_6$ alkyl group, or a $C_1$ to $C_6$ alkoxy group, and $R^1$ and $R^2$ may be the same or different)

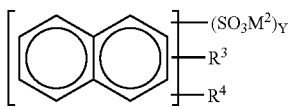 (6)

(where $M^2$ is a hydrogen atom or a counter ion that constitutes a salt, Y is an integer of at least 3, $R^3$ and $R^4$ are each a hydrogen atom, a $C_1$ to $C_6$ alkyl group, or a $C_1$ to $C_6$ alkoxy group, and $R^3$ and $R^4$ may be the same or different).

Because the ink composition of the second embodiment is constituted as above, early fading of cyan images can be effectively prevented, without any additive precipitation occurring, and this in turn makes it possible for the indoor storage stability (gas resistance) of images produced from this ink composition to be increased without any problems.

The ink composition of the second embodiment contains, in water or an aqueous medium composed of water and a water-soluble organic solvent, at least a phthalocyanine-based cyan dye and an aromatic compound having a sulfo group and expressed by General Formulas 5 and/or 6, and/or a salt thereof, but can also contain a humectant, viscosity regulator, pH regulator, and other such additives as needed.

There are no particular restrictions on the cyan dye used in the ink composition of the second embodiment as long as it is a phthalocyanine-based cyan dye. The cyan dye used in the ink composition of the second embodiment is the same as the cyan dye in the ink composition of the first embodiment above. Therefore, the details pertaining to the cyan dye given in the first embodiment above also apply to the cyan dye in this embodiment.

The ink composition of this embodiment contains at least one type of a specific aromatic compound having three or more sulfo groups, and/or a salt thereof, in order to suppress the color change and fading seen when printing with an ink composition containing the above-mentioned phthalocyanine-based cyan dye (and which is caused by poor gas resistance, and particularly ozone resistance, on the part of the phthalocyanine-based cyan dye).

The result of using the above-mentioned phthalocyanine-based cyan dye together with this specific aromatic compound having three or more sulfo groups, and/or a salt thereof, is that color change and fading of an image caused by ozone gas is suppressed, without causing the problem of additive precipitation, and the fading resistance of the image is markedly increased.

The ink composition of this embodiment contains at least one type of aromatic compound having three or more sulfo groups and expressed by the following General Formulas 5 and/or 6, and/or a salt thereof, in order to alleviate or eliminate the color change and fading seen when printing with an ink composition containing a phthalocyanine-based cyan dye (and which seems to be caused by poor gas resistance, and particularly ozone resistance, on the part of the phthalocyanine-based cyan dye).

Exactly how the ink composition of this embodiment works is not clear, but it is believed that when an aromatic compound having a sulfo group, and/or a salt thereof, is selectively used so that said compound will have three or more sulfo groups and be expressed by the above-mentioned General Formulas 5 and/or 6, the water solubility of said aromatic compound is increased, and as a result, this prevents or suppresses the precipitation of said aromatic compound onto the surface of the recording medium. This makes it possible to improve the gas resistance, and particularly the ozone resistance, of printed matter without incurring any problems.

With this embodiment, an aromatic compound having three or more sulfo groups and expressed by General Formulas 5 and/or 6, and/or a salt thereof, is used in combination with a phthalocyanine-based cyan dye, which markedly improves image fading resistance and suppresses color change and fading of an image caused by ozone gas, without causing any greening or blackening as a result of NOx gas, and also without causing any additive precipitation.

Also, with this embodiment, if the ink composition contains water, a phthalocyanine-based cyan dye, and at least one type of aromatic compound having three or more sulfo groups, and/or a salt thereof, then the color change and fading seen in printing can be effectively prevented not only with a cyan ink composition, but also with ink compositions of different colors other than cyan, such as a black ink composition. Other conventional dyes can be used concurrently in order to produce these types of ink composition.

The aromatic compound having three or more sulfo groups and expressed by General Formulas 5 and/or 6, and/or a salt thereof, can be any aromatic compound having at least three sulfo groups in its molecular structure, and/or a salt thereof, but in terms of improving the ozone resistance and additive precipitation suppression in the obtained image, it is preferable for this compound to be at least one type selected from the group consisting of naphthalene-1,3,5-trisulfonic acid, naphthalene-1,3,6-trisulfonic acid, naphthalene-1,3,7-trisulfonic acid, naphthalene-1,4,6-trisulfonic acid, naphthalene-1,4,7-trisulfonic acid, and salts thereof. It is particularly favorable to use a lithium salt of one of these aromatic sulfonic acid compounds because it will also be effective in terms of suppressing bronzing in the printed image.

The amount in which the aromatic compound having sulfo groups, and/or a salt thereof, is contained is suitably determined according to the type of aromatic compound having sulfo groups, the type of salt thereof, the type of dye, the type of solvent component, and so forth, but is preferably from 0.1 to 10 wt %, and even more preferably 0.5 to 10 wt %, with respect to the total amount of the ink composition.

In terms of effectively increasing gas resistance and ensuring good ink reliability, it is preferable if the phthalocyanine-based cyan dye and the aromatic compound having sulfo groups, and/or a salt thereof, are contained in the ink composition of this embodiment in a ratio (former:latter) of 1:0.1 to 1:10, with a range of 1:0.2 to 1:5 being particularly favorable.

The pH of the ink composition in this embodiment, other additives (such as a humectant, a nitrogen-containing organic solvent, nonionic surfactant, or a penetration enhancer) and the amounts in which these are contained, and the method for preparing the ink composition are all the same as for the ink composition in the first embodiment above, and the particulars thereof are also suitably applied in this embodiment.

Third Embodiment

The ink composition pertaining to a third embodiment of the present invention is characterized by containing at least water, a phthalocyanine-based cyan dye, and a lithium salt of an aromatic compound having a sulfo group and expressed by the following General Formulas 1 and/or 2, wherein the phthalocyanine-based cyan dye is expressed by the following Formula 3:

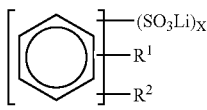

(1)

(where X is an integer of at least 1, $R^1$ and $R^2$ are each a hydrogen atom, a $C_1$ to $C_6$ alkyl group, or a $C_1$ to $C_6$ alkoxy group, and $R^1$ and $R^2$ may be the same or different)

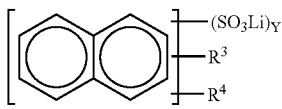

(2)

(where Y is an integer of at least 1, $R^3$ and $R^4$ are each a hydrogen atom, a $C_1$ to $C_6$ alkyl group, or a $C_1$ to $C_6$ alkoxy group, and $R^3$ and $R^4$ may be the same or different).

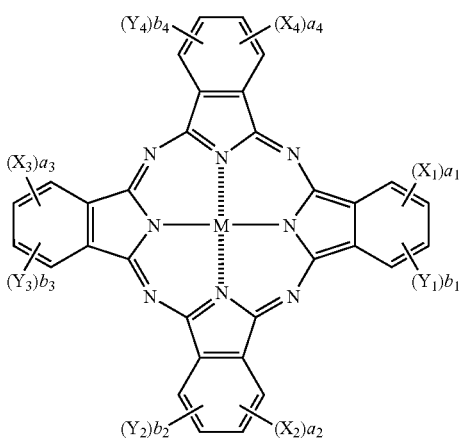

(3)

(where $X_1$, $X_2$, $X_3$, and $X_4$ are each independently —SO-Z or —$SO_2$-Z; each Z here is independently a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group, $Y_1$, $Y_2$, $Y_3$, and $Y_4$ are each independently a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureido group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, or ionic hydrophilic group, where each of these groups may have a substituent, $a_1$ to $a_4$ and $b_1$ to $b_4$ are the number of substituents of $X_1$ to $X_4$ and $Y_1$ to $Y_4$, respectively, $a_1$ to $a_4$ are each independently an integer from 0 to 4, but all cannot be 0 at the same time, and $b_1$ to $b_4$ are each independently an integer from 0 to 4, M is a hydrogen atom or a metal element or an oxide, hydroxide, or halide thereof, and at least one of $X_1$, $X_2$, $X_3$, $X_4$, $Y_1$, $Y_2$, $Y_3$, and $Y_4$ is an ionic hydrophilic group or a group that has an ionic hydrophilic group as a substituent).

Because the ink composition of the third embodiment is constituted as above, there are no problems such as additive precipitation or bronzing, and early fading of cyan images can be effectively prevented. This in turn makes it possible for the quality of images produced from this ink composition to be maintained at a good level over an extended period.

The ink composition of the third embodiment contains, in water or an aqueous medium composed of water and a water-soluble organic solvent, at least a phthalocyanine-based cyan dye expressed by Formula 3 above and a lithium salt of an aromatic compound having a sulfo group and expressed by the General Formulas 1 and/or 2 above, but can also contain a humectant, viscosity regulator, pH regulator, and other such additives as needed.

The cyan dye used in the ink composition of this embodiment, that is, the phthalocyanine-based cyan dye expressed by Formula 3 above, will be described in detail.

In General Formula 3, $X_1$, $X_2$, $X_3$, and $X_4$ are each independently —SO-Z or —$SO_2$-Z, with —$SO_2$-Z being particularly favorable.

Each of the Z groups is independently a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group. Of these, a substituted alkyl group, substituted aryl group, or substituted heterocyclic group is preferable, a substituted alkyl group or substituted aryl group is even more preferable, and a substituted alkyl group is best.

The substituted or unsubstituted alkyl group expressed by Z is preferably a $C_1$ to $C_{30}$ alkyl group. Examples of substituents are the same as the substituents when it is possible for Z, $Y_1$, $Y_2$, $Y_3$, and $Y_4$ (discussed below) to further have a substituent.

The substituted or unsubstituted cycloalkyl group expressed by Z is preferably a $C_5$ to $C_{30}$ cycloalkyl group. Examples of substituents are the same as the substituents when it is possible for Z, $Y_1$, $Y_2$, $Y_3$, and $Y_4$ (discussed below) to further have a substituent.

The substituted or unsubstituted alkenyl group expressed by Z is preferably a $C_2$ to $C_{30}$ alkenyl group. Examples of substituents are the same as the substituents when it is possible for Z, $Y_1$, $Y_2$, $Y_3$, and $Y_4$ (discussed below) to further have a substituent.

The substituted or unsubstituted aralkyl group expressed by Z is preferably a $C_7$ to $C_{30}$ aralkyl group. Examples of substituents are the same as the substituents when it is possible for Z, $Y_1$, $Y_2$, $Y_3$, and $Y_4$ (discussed below) to further have a substituent.

The substituted or unsubstituted aryl group expressed by Z is preferably a $C_6$ to $C_{30}$ aryl group. Examples of substituents are the same as the substituents when it is possible for Z, $Y_1$, $Y_2$, $Y_3$, and $Y_4$ (discussed below) to further have a substituent.

The heterocyclic group expressed by Z is preferably a five- or six-member ring, and may also have undergone ring contraction. It may be either an aromatic hetero ring or a non-aromatic hetero ring. Examples of the heterocyclic group expressed by Z are given below in the form of a hetero ring without the substitution position being indicated, but there are no restrictions on the substitution position, and in the case of pyridine, for example, it can be substituted in the 2-, 3-, or 4-position. These examples include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoaole, thiazole, benzothiazole, isothiazole, benzisothiazole, thiadiazole, isoxazole, benzisoxazole, pyrrolidine, piperidine, piperazine, imidazolidine, and thiazoline. Of these, an aromatic heterocyclic group is preferred. Similarly to the above, preferred examples of aromatic heterocyclic groups include pyridine, pyrazine, pyrimidine, pyridazine, triazine, pyrazole, imidazole, benzimidazole, triazole, thiazole, benzothiazole, isothiazole, benzisothiazole, and thiadiazole.

Each of these may have a substituent, and examples of substituents are the same as the substituents when it is possible for Z, $Y_1$, $Y_2$, $Y_3$, and $Y_4$ (discussed below) to further have a substituent.

$Y_1$, $Y_2$, $Y_3$, and $Y_4$ are each independently a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureido group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, carboxyl group, or sulfo group, and each may have a substituent.

Of these, a hydrogen atom, halogen atom, alkyl group, aryl group, cyano group, alkoxy group, amide group, ureido group, sulfonamide group, carbamoyl group, alkoxycarbonyl group, carboxyl group, or sulfo group is preferable; a hydrogen atom, halogen atom, cyano group, carboxyl group, or sulfo group is particularly preferable; and a hydrogen atom is most preferable.

When $Y_1$, $Y_2$, $Y_3$, $Y_4$, and Z are groups capable of having yet another substituent, they may further have the substituents listed below.

A halogen atom (such as a chlorine atom or bromine atom); $C_1$ to $C_{12}$ straight-chain or branched alkyl group, $C_7$ to $C_{18}$ aralkyl group, $C_2$ to $C_{12}$ alkenyl group, $C_2$ to $C_{12}$ straight-chain or branched alkynyl group, $C_3$ to $C_{12}$ cycloalkyl group that may have a side chain, or $C_3$ to $C_{12}$ cycloalkenyl group that may have a side chain (specific examples of the above groups include methyl, ethyl, propyl, isopropyl, t-butyl, 2-methylsulfonylethyl, 3-phenoxypropyl, trifluoromethyl, and cyclopentyl); aryl group (such as phenyl, 4-t-butylphenyl, or 2,4-di-t-amylphenyl); heterocyclic group (such as imidazolyl, pyrazolyl, triazolyl, 2-furyl, 2-chenyl, 2-pyrimidinyl, or 2-benzothiazolyl); alkoxy group (such as methoxy, ethoxy, 2-methoxyethoxy, or 2-methylsulfonylethoxy); aryloxy group (such as phenoxy, 2-methylphenoxy, 4-t-butylphenoxy, 3-nitrophenoxy, 3-t-butyloxycarbonylphenoxy, or 3-methoxycarbonylphenoxy); acylamino group (such as acetamide, benzamide, or 4-(3-t-butyl-4-hydroxyphenoxy)butanamide); alkylamino group (such as methylamino, butylamino, diethylamino, or methylbutylamino); anilino group (such as phenylamino or 2-chloroanilino); ureido group (such as phenylureido, methylureido, or N,N-dibutylureido); sulfamoylamino group (such as N,N-dipropylsulfamoylamino); alkylthio group (such as methylthio, octylthio, or 2-phenoxyethylthio); arylthio group (such as phenylthio, 2-butoxy-5-t-octylphenylthio, or 2-carboxyphenylthio); alkyloxycarbonylamino group (such as methoxycarbonylamino), sulfonamide group (such as methanesulfonamide, benzenesulfonamide, or p-toluenesulfonamide); carbamoyl group (such as N-ethylcarbamoyl or N,N-dibutylcarbamoyl); sulfamoyl group (such as N-ethylsulfamoyl, N,N-dipropylsulfamoyl, or N,N-diethylsulfamoyl); sulfonyl group (such as methylsulfonyl, octylsulfonyl, phenylsulfonyl, or 4-methylphenylsulfonyl); alkyloxycarbonyl group (such as methoxycarbonyl or butyloxycarbonyl); heterocyclic oxy group (such as 1-phenyltetrazole-5-oxy or 2-tetrahydropyranyloxy); azo group (such as phenylazo, 4-methoxyphenylazo, 4-pivaloylaminophenylazo, or 2-hydroxy4-propanoylphenylazo); acyloxy group (such as acetoxy); carbamoyloxy group (such as N-methylcarbamoyloxy or N-phenylcarbamoyloxy), silyloxy group (such as trimethylsilyloxy or dibutylmethylsilyloxy); aryloxycarbonylamino group (such as phenoxycarbonylamino); imide group (such as N-succinimide or N-phthalimide); heterocyclic thio group (such as 2-benzothiazolylthio, 2,4-di-phenoxy-1,3,5-triazole-6-thio, or 2-pyridylthio); sulfinyl group (such as 3-phenoxypropylsulfinyl); phosphonyl group (such as phenoxyphosphonyl, octyloxyphosphonyl, or phenylphosphonyl); aryloxycarbonyl group (such as phenoxycarbonyl), acyl group (such as acetyl, 3-phenylpropanoyl, or benzoyl), ionic hydrophilic group (such as a carboxyl group, sulfo group, quaternary ammonium group, sulfonylsulfamoyl group, or acylsulfamoyl group); or cyano group, hydroxy group, nitro group, or amino group. Of these substituents, a hydroxy group, alkoxy group, sulfamoyl group, sulfonamide group, acylamino group, carbamoyl group, cyano group, or ionic hydrophilic group is preferable, and of these, a hydroxy group, sulfamoyl group, or ionic hydrophilic group is particularly preferable.

In General Formula 3, $a_1$ to $a_4$ and $b_1$ to $b_4$ are the number of substituents of $X_1$ to $X_4$ and $Y_1$ to $Y_4$, respectively. $a_1$ to $a_4$ are each independently an integer from 0 to 4, but all cannot be 0 at the same time, and $b_1$ to $b_4$ are each independently an integer from 0 to 4. If $a_1$ to $a_4$ and $b_1$ to $b_4$ are integers greater than or equal to 2, the plurality of $X_1$ to $X_4$ and $Y_1$ to $Y_4$ may be the same as or different from each other.

$a_1$ and $b_1$ satisfy the relation $a_1+b_1=4$, and are each independently an integer from 0 to 4. It is particularly favorable to use a combination in which $a_1$ is 1 or 2 and $b_1$ is 3 or 2, with the best combination being one in which $a_1$ is 1 and $b_1$ is 3.

$a_2$ and $b_2$ satisfy the relation $a_2+b_2=4$, and are each independently an integer from 0 to 4. It is particularly favorable to use a combination in which $a_2$ is 1 or 2 and $b_2$ is 3 or 2, with the best combination being one in which $a_2$ is 1 and $b_2$ is 3.

$a_3$ and $b_3$ satisfy the relation $a_3+b_3=4$, and are each independently an integer from 0 to 4. It is particularly favorable to use a combination in which $a_3$ is 1 or 2 and $b_3$ is 3 or 2, with the best combination being one in which $a_3$ is 1 and $b_3$ is 3.

$a_4$ and $b_4$ satisfy the relation $a_4+b_4=4$, and are each independently an integer from 0 to 4. It is particularly favorable to use a combination in which $a_4$ is 1 or 2 and $b_4$ is 3 or 2, with the best combination being one in which $a_4$ is 1 and $b_4$ is 3.

M is a hydrogen atom, a metal element, a metal oxide, a metal hydroxide, or a metal halide.

Examples of M other than a hydrogen atom include metal elements such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, and Bi. Examples of metal oxides include VO and GeO. Examples of metal hydroxides include $Si(OH)_2$, $Cr(OH)_2$, and $Sn(OH)_2$. Examples of metal halides include AlCl, $SiCl_2$, VCl, $VCl_2$, VOCl, FeCl, GaCl, and ZrCl. Of these, Cu, Ni, Zn, and Al are preferred, and Cu is best of all.

With the phthalocyanine compound expressed by General Formula 3, a phthalocyanine ring (Pc) may form a dimer (such as Pc-M-L-M-Pc) or trimer via a divalent linking group (L). In this case, the plurality of M groups may be the same as or different from each other.

The divalent linking group expressed by L is preferably an oxy group (—O—), thio group (—S—), carbonyl group (—CO—), sulfonyl group (—SO$_2$—), imino group (—NH—), methylene group (—CH$_2$—), or a group formed by combining these groups.

The molecular weight of the phthalocyanine compound in General Formula 3 is preferably between 750 and 3000, with a molecular weight between 995 and 2500 being even better, a molecular weight between 995 and 2000 being better yet, and a molecular weight between 995 and 1800 being best of all.

If the phthalocyanine compound expressed by General Formula 3 is such that a phthalocyanine ring (Pc) forms a dimer (such as Pc-M-L-M-Pc) or trimer via a divalent linking group (L), then the preferred molecular weight, such as the best molecular weight, is two (in the case of a dimer) or three (in the case of a trimer) times the above-mentioned best molecular weight range (995 to 1800). The preferred molecular weight of the above-mentioned dimer or trimer is the value including the linking group L.

At least one of $X_1$, $X_2$, $X_3$, $X_4$, $Y_1$, $Y_2$, $Y_3$, and $Y_4$ in the phthalocyanine compound expressed by General Formula 3 is an ionic hydrophilic group or a group that has an ionic hydrophilic group as a substituent.

Ionic hydrophilic groups that are used as substituents include a sulfo group (—SO$_3^-$X$^+$), carboxyl group (—CO$_2^-$X$^+$), quaternary ammonium group (—N$^+$RR'R''X$^-$), acylsulfamoyl group (—SO$_2$N$^+$X$^-$COR), sulfonylcarbamoyl group (—CON$^+$X$^-$SO$_2$R), and sulfonylsulfamoyl group (—SO$_2$N$^+$X$^-$SO$_2$R). A sulfo group, carboxyl group, or quaternary ammonium group is preferable, and a sulfo group is particularly favorable. The sulfo group, carboxyl group, acylsulfamoyl group, sulfonylcarbamoyl group, and sulfonylsulfamoyl group may be in the form of a salt, and examples of the counter ion that forms the salt include an alkali metal ion (such as a sodium ion, potassium ion, or lithium ion), ammonium ion, organic cation (such as a tetramethylguanidinium ion), and organic and/or inorganic anion (such as a halogen ion, methanesulfonic acid ion, or benzenesulfonic acid ion). X in the parentheses above is a hydrogen atom or a counter ion, and R, R', and R'' are substituents. Particularly when the ionic hydrophilic group is a sulfo group, in terms of suppressing bronzing in the printed image, these X groups are most preferably a lithium ion.

In each molecule of the phthalocyanine compound expressed by General Formula 3 there is present at least one ionic hydrophilic group or one group having an ionic hydrophilic group as a substituent, so this compound has good solubility or dispersibility in aqueous media. From this standpoint, the phthalocyanine compound expressed by General Formula 3 preferably has at least two ionic hydrophilic groups per molecule, and even more preferably at least one of the plurality of ionic hydrophilic groups is a sulfo group, and most preferably there are at least two sulfo groups per molecule.

Compounds having the following combinations (a) to (f) are particularly favorable examples of the phthalocyanine compound expressed by General Formula 3.

(a) $X_1$ to $X_4$ are preferably each independently —SO$_2$-Z.

(b) Each Z is independently a substituted or unsubstituted alkyl group, substituted or unsubstituted aryl group, or substituted or unsubstituted heterocyclic group, and of these, a substituted alkyl group, substituted aryl group, or substituted heterocyclic group is preferable, with a substituted alkyl group being most preferable.

(c) $Y_1$ to $Y_4$ are preferably each independently a hydrogen atom, halogen atom, alkyl group, aryl group, cyano group, alkoxy group, amide group, ureido group, sulfonamide group, carbamoyl group, sulfamoyl group, alkoxycarbonyl group, carboxyl group, or sulfo group, with a hydrogen atom, halogen atom, cyano group, carboxyl group, or sulfo group being even more preferable, and a hydrogen atom being best of all.

(d) $a_1$ to $a_4$ are preferably each independently 1 or 2, with 1 being particularly favorable $b_1$ to $b_4$ are preferably each independently 3 or 2, with 3 being particularly favorable.

(e) M is preferably Cu, Ni, Zn, or Al, with Cu being best of all.

(f) The molecular weight of the phthalocyanine compound is preferably between 750 and 3000, with a molecular weight between 995 and 2500 being even better, a molecular weight between 995 and 2000 being better yet, and a molecular weight between 995 and 1800 being best of all.

As to the combination of preferable substituents in the compound expressed by General Formula 3, a compound in which at least one of the various substituents is one of the above-mentioned preferable substituents is preferred, and it is even more preferable for more of the various substituents to be the above-mentioned preferable substituents, and best for all of the substituents to be the above-mentioned preferable substituents.

Of the phthalocyanine compounds expressed by General Formula 3, a phthalocyanine compound with a structure expressed by the following General Formula 7 is even more preferable. The phthalocyanine compound expressed by General Formula 7 and used in this embodiment will now be described in detail.

(7)

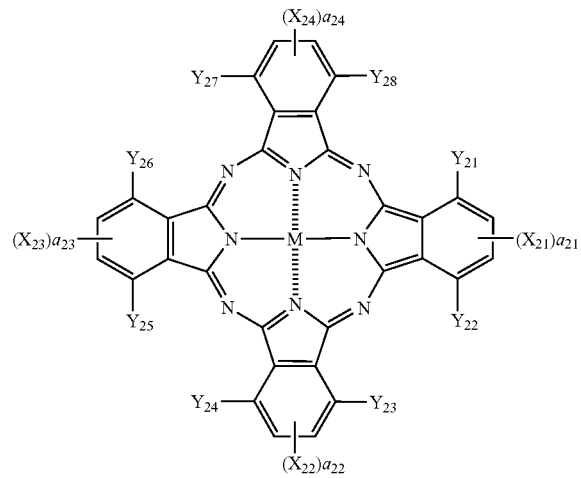

In General Formula 7 above, $X_{21}$, $X_{22}$, $X_{23}$, and $X_{24}$ are each independently —SO-Z or —SO$_2$-Z, with —SO$_2$-Z, being particularly favorable.

Z is defined the same as in General Formula 3, and the preferable examples are also the same.

$Y_{21}$ to $Y_{28}$ are each independently defined the same as $Y_1$, $Y_2$, $Y_3$, and $Y_4$ in General Formula 3, and the preferable examples are also the same.

$a_{21}$ to $a_{24}$ satisfy the relation $4 \leq a_{21}+a_{22}+a_{23}+a_{24} \leq 8$, and preferably $4 \leq a_{21}+a_{22}+a_{23}+a_{24} \leq 6$, and are each independently an integer of 1 or 2. It is particularly favorable if $a_{21}=a_{22}=a_{23}=a_{24}=1$.

M is defined the same as M in General Formula 3.

At least one of $X_{21}$, $X_{22}$, $X_{23}$, $X_{24}$, $Y_{21}$, $Y_{22}$, $Y_{23}$, $Y_{24}$, $Y_{25}$, $Y_{26}$, $Y_{27}$, and $Y_{28}$ is an ionic hydrophilic group or a group having an ionic hydrophilic group as a substituent.

Examples of the ionic hydrophilic group are the same as those given for $X_1$, $X_2$, $X_3$, and $X_4$ in General Formula 3, and the preferable examples are also the same.

In each molecule of the phthalocyanine compound expressed by General Formula 7 there is present at least one ionic hydrophilic group or one group having an ionic hydrophilic group as a substituent, so this compound has good solubility or dispersibility in aqueous media. From this standpoint, the phthalocyanine compound expressed by General Formula 7 preferably has at least two ionic hydrophilic groups per molecule, and even more preferably at least one of the plurality of ionic hydrophilic groups is a sulfo group, and most preferably there are at least two sulfo groups per molecule.

The molecular weight of the phthalocyanine compound in General Formula 7 is preferably between 750 and 3000, with a molecular weight between 995 and 2500 being even better, a molecular weight between 995 and 2000 being better yet, and a molecular weight between 995 and 1800 being best of all.

If the phthalocyanine compound expressed by General Formula 7 is such that a phthalocyanine ring (Pc) forms a dimer (such as Pc-M-L-M-Pc) or trimer via a divalent linking group (L), then the preferred molecular weight, such as the best molecular weight, is two (in the case of a dimer) or three (in the case of a trimer) times the above-mentioned best molecular weight range (995 to 1800). The preferred molecular weight of the above-mentioned dimer or trimer is the value including the linking group L.

Compounds having the following combinations (a) to (f) are particularly favorable examples of the phthalocyanine compound expressed by General Formula 7.

(a) $X_{21}$ to $X_{24}$ are preferably each independently —SO$_2$-Z.

(b) Each Z is independently a substituted or unsubstituted alkyl group, substituted or unsubstituted aryl group, or substituted or unsubstituted heterocyclic group, and of these, a substituted alkyl group, substituted aryl group, or substituted heterocyclic group is preferable, with a substituted alkyl group being most preferable.

(c) $Y_{21}$ to $Y_{28}$ are preferably each independently a hydrogen atom, halogen atom, alkyl group, aryl group, cyano group, alkoxy group, amide group, ureido group, sulfonamide group, carbamoyl group, sulfamoyl group, alkoxycarbonyl group, carboxyl group, or sulfo group, with a hydrogen atom, halogen atom, cyano group, carboxyl group, or sulfo group being even more preferable, and a hydrogen atom being best of all.

(d) $a_{11}$ to $a_{14}$ are preferably each independently 1 or 2. It is particularly favorable if $a_{11}=a_{12}=a_{13}=a_{14}=1$.

(e) M is preferably Cu, Ni, Zn, or Al, with Cu being best of all.

(f) The molecular weight of the phthalocyanine compound is preferably between 750 and 2500, with a molecular weight between 995 and 2500 being even better, a molecular weight between 995 and 2000 being better yet, and a molecular weight between 995 and 1800 being best of all.

As to the combination of preferable substituents in the compound expressed by General Formula 7, a compound in which at least one of the various substituents is one of the above-mentioned preferable substituents is preferred, and it is even more preferable for more of the various substituents to be the above-mentioned preferable substituents, and best for all of the substituents to be the above-mentioned preferable substituents.

Of the phthalocyanine compounds expressed by General Formula 7, a phthalocyanine compound with a structure expressed by the following General Formula 8 is even more preferable. The phthalocyanine compound expressed by General Formula 8 that can be used favorably in the present invention will now be described in detail.

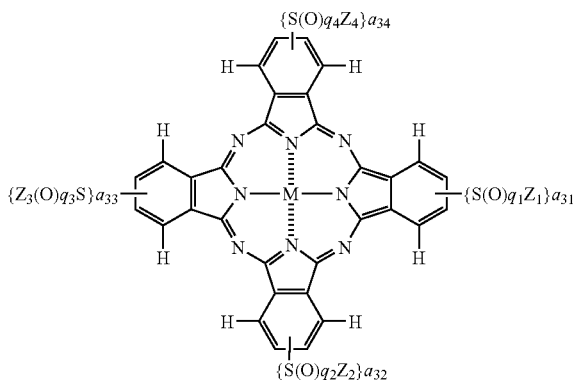

(8)

In General Formula 8, $Z_1$, $Z_2$, $Z_3$, and $Z_4$ are each independently defined the same as Z in General Formula 3, and the preferable examples are also the same.

$q_1$, $q_2$, $q_3$, and $q_4$ are each independently an integer of 1 or 2, with 2 being particularly favorable, and it is best if $q_1=q_2=q_3=q_4=2$.

$a_{31}$, $a_{32}$, $a_{33}$, and $a_{34}$ are each independently an integer of 1 or 2, with 1 being particularly favorable, and it is best if $a_{31}=a_{32}=a_{33}=a_{34}=1$.

M is defined the same as M in General Formula 3.

At least one of $Z_1$, $Z_2$, $Z_3$, and $Z_4$ has an ionic hydrophilic group as a substituent.

Examples of the ionic hydrophilic group are the same as those given for Z in General Formula 3, and the preferable examples are also the same.

The molecular weight of the phthalocyanine compound is preferably between 750 and 2500, with a molecular weight between 995 and 2500 being even better, a molecular weight between 995 and 2000 being better yet, and a molecular weight between 995 and 1800 being best of all.

Of the compounds expressed by General Formula 3 and used in the present invention, compounds expressed by the following General Formula 4 are particularly favorable.

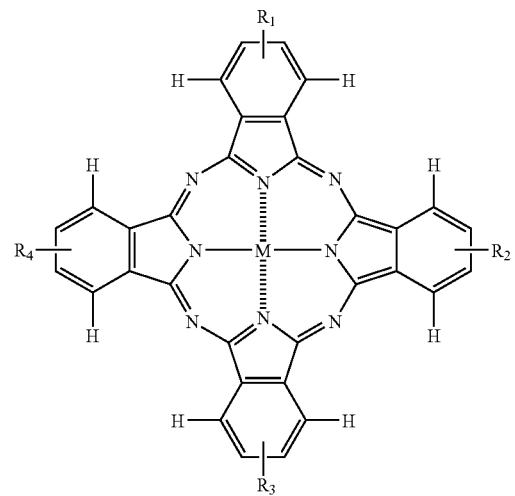

(4)

In the formula, M is defined the same as in General Formula 3, and $R_1$ to $R_4$ are each independently —SO$_2$Z. Z is defined the same as Z in General Formula 3, and the preferable examples are also the same. At least one of the four Z groups has an ionic hydrophilic group as a substituent.

Of the above compounds, a preferred compound is one in which M in General Formula 4 is elemental copper, and the Z groups having ionic hydrophilic groups as a substituent are sulfoalkyl groups, and it is even more preferable if the sulfo group is in the form of a salt, and the counter ion that forms the salt is a lithium ion.

The phthalocyanine compound expressed by the following General Formula 9 that can be used favorably in this embodiment is synthesized by reacting a metal derivative expressed by M-(Y)d with a phthalocyanine compound expressed by the following General Formula 10 and/or a diiminoisoindoline derivative expressed by the following General Formula 11, for example. In the formulas, Z and $Z_1$ to $Z_4$ are defined the same as Z in General Formula 3, and M is defined the same as M in General Formula 3. Y is a halogen atom, acetic acid anion, acetyl acetonate, oxygen, or other such monovalent or divalent ligand, and d is an integer of from 1 to 4. Examples of metal derivatives expressed by M-(Y)d include halides, carboxylic acid derivatives, sulfates, nitrates, carbonyl compounds, oxides, complexes, and so forth of Al, Si, Ti, V, Mn, Fe, Co, Ni, Cu, Zn, Ge, Ru, Rh, Pd, In, Sn, Pt, and Pb. Specific examples include copper chloride, copper bromide, copper iodide, nickel chloride, nickel bromide, nickel acetate, cobalt chloride, cobalt bromide, cobalt acetate, zinc chloride, zinc bromide, zinc iodide, zinc acetate, vanadium chloride, vanadium oxytrichloride, palladium chloride, palladium acetate, aluminum chloride, manganese chloride, manganese acetate, manganese acetylacetonate, manganese chloride, lead chloride, lead acetate, indium chloride, titanium chloride, and tin chloride.

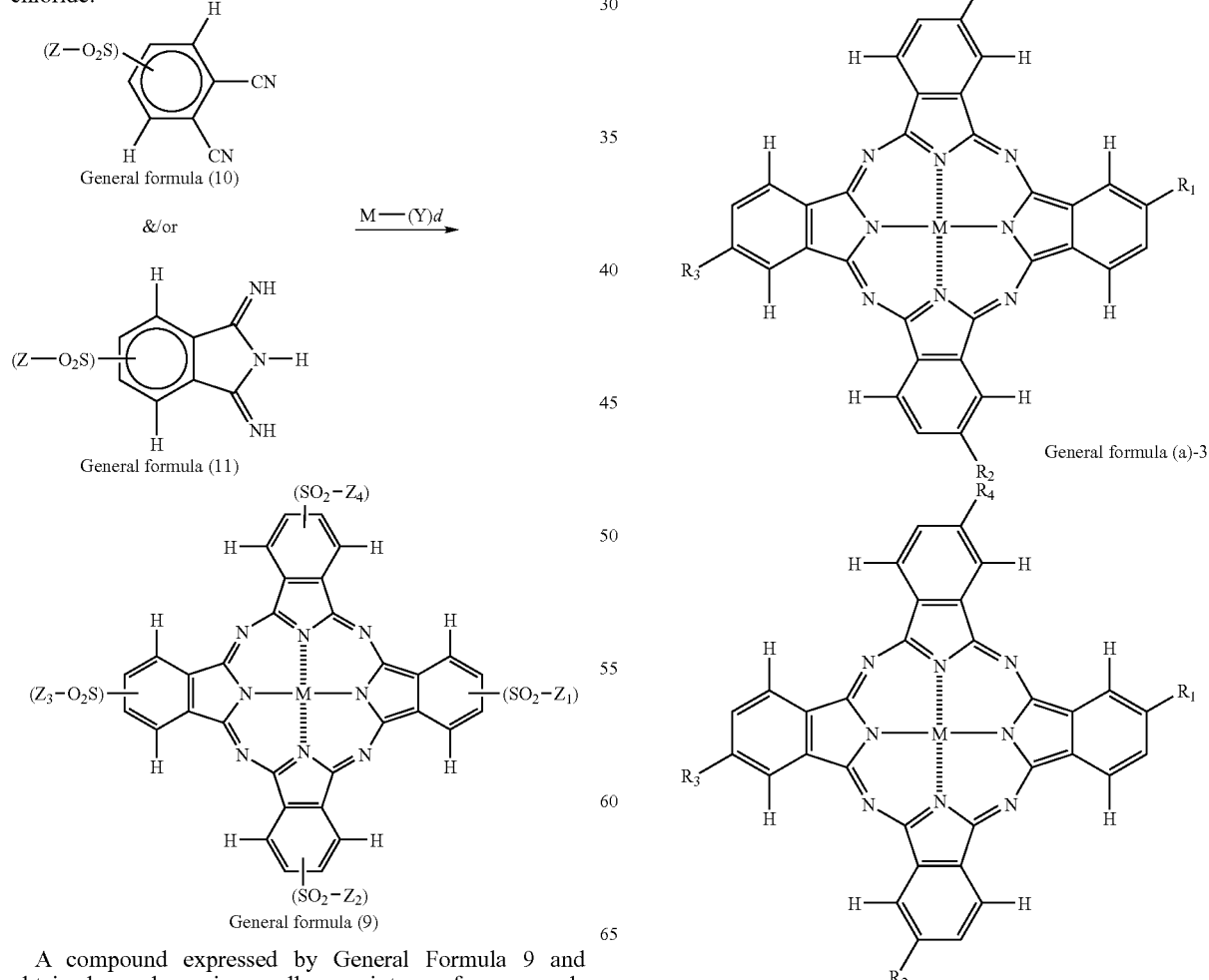

General formula (10)

&/or

General formula (11)

M—(Y)d

General formula (9)

A compound expressed by General Formula 9 and obtained as above is usually a mixture of compounds expressed by the following General Formulas (a)-1 to (a)-4, which are isomers at the substitution positions of $R_1(SO_2$-$Z_1)$, $R_2(SO_2$-$Z_2)$, $R_3(SO_2$-$Z_3)$, and $R_4(SO_2$-$Z_4)$.

Furthermore, when a dye is prepared using compounds of General Formula 10 and/or General Formula 11 in which there are two or more different kinds of substituent, the compounds expressed by General Formula 9 will be dye mixtures of different kinds and positions of substituent.

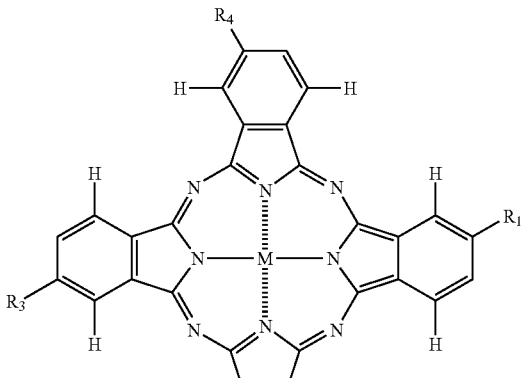

General formula (a)-1

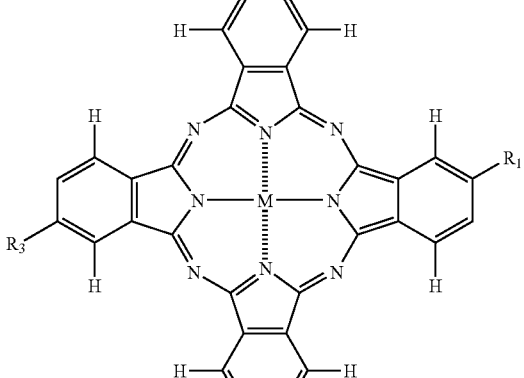

General formula (a)-2

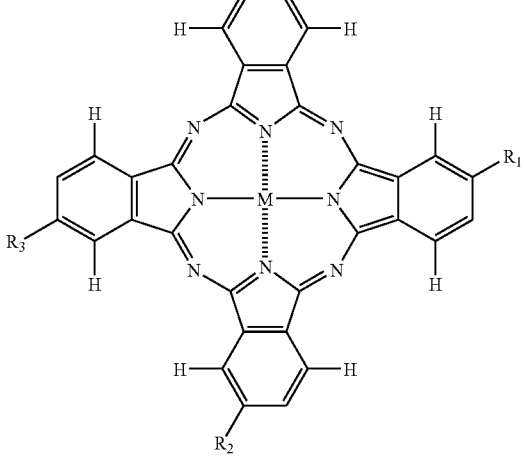

General formula (a)-3

General formula (a)-4

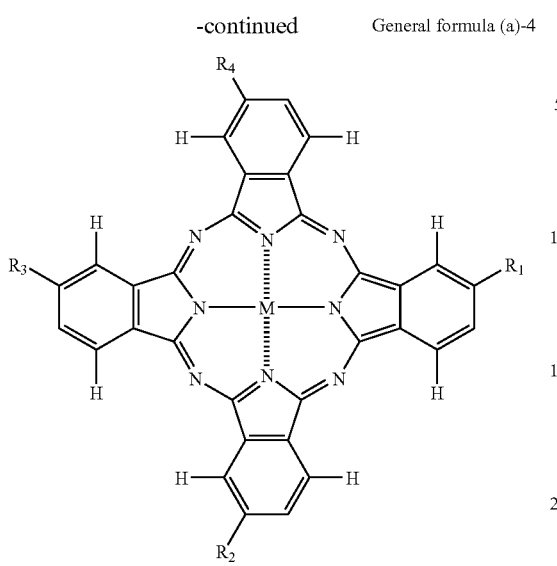

Examples of the cyan dye used in this embodiment are given in Japanese Laid-Open Patent Applications 2002-249677, 2003-213167, and 2003-213168, and also include compounds of corresponding structure cited in Japanese Laid-Open Patent Application 2004-2670, but preferable examples are listed in the following tables. The compounds listed in Tables 1 and 2 can be synthesized by the methods described in the above-mentioned publications. Naturally, the starting compounds, colorant intermediates, and synthesis methods are not limited to these.

TABLE 1

In General Formula 9:

| | M | $Z_1$ | $Z_2$ | $Z_3$ | $Z_4$ |
|---|---|---|---|---|---|
| Compound A | Cu | $-(CH_2)_3SO_3Na$ | $-(CH_2)_3SO_3Na$ | $-(CH_2)_3SO_3Na$ | $-(CH_2)_3SO_3Na$ |
| Compound B | Cu | $-(CH_2)_3SO_3Li$ | $-(CH_2)_3SO_3Li$ | $-(CH_2)_3SO_3Li$ | $-(CH_2)_3SO_3Li$ |
| Compound C | Cu | $-(CH_2)_3CO_2K$ | $-(CH_2)_3CO_2K$ | $-(CH_2)_3CO_2K$ | $-(CH_2)_3CO_2K$ |
| Compound D | Cu | $-CH_2CH(OH)CH_2SO_3Li$ | $-CH_2CH(OH)CH_2SO_3Li$ | $-CH_2CH(OH)CH_2SO_3Li$ | $-CH_2CH(OH)CH_2SO_3Li$ |
| Compound E | Cu | $-(CH_2)_2CH(CH_3)SO_3Li$ | $-(CH_2)_2CH(CH_3)SO_3Li$ | $-(CH_2)_2CH(CH_3)SO_3Li$ | $-(CH_2)_2CH(CH_3)SO_3Li$ |

TABLE 2

In the following formula:

$$M-Pc\begin{matrix}(SO_2R_1)n\\ \\(SO_2R_2)m\end{matrix}=$$

(phthalocyanine structure with $SO_2R$ substituents, $RSO_2$, $SO_2R$, $SO_2R$ around the ring, central M)

| | M | $R_1$ | n | $R_2$ | m |
|---|---|---|---|---|---|
| Compound F | Cu | $-(CH_2)_3SO_3Li$ | 3 | $-(CH_2)_3SO_2NHCH_2CH(OH)CH_3$ | 1 |
| Compound G | Cu | $-(CH_2)_3SO_3Li$ | 2 | $-(CH_2)_3SO_2NHCH_2CH(OH)CH_3$ | 2 |

TABLE 2-continued

| Compound H | Cu | —(CH$_2$)$_3$SO$_3$Li | 3 | —(CH$_2$)$_3$SO$_2$NHCH(CH$_3$)CH$_2$OH | 1 |
| Compound I | Cu | —(CH$_2$)$_3$SO$_3$Li | 2 | —(CH$_2$)$_3$SO$_2$NHCH(CH$_3$)CH$_2$OH | 2 |
| Compound J | Cu | —(CH$_2$)$_3$SO$_3$Li | 3 | —(CH$_2$)$_3$SO$_2$N(C$_2$H$_4$OH)$_2$ | 1 |
| Compound K | Cu | —(CH$_2$)$_3$SO$_3$Li | 3 | —(CH$_2$)$_3$CO$_2$Li | 1 |

In the tables, the positional order in which the substituents of (SO$_2$R$_1$) and (SO$_2$R$_2$) are introduced could not be measured. The values of m and n (which indicate the isomer expressed by the above-mentioned (a)-1 to (a)-4) are the molar ratios in which the phthalonitrile derivatives used in the synthesis of phthalocyanine derivatives are supplied.

The amount in which the dye is contained is determined according to the type of compound expressed by General Formula 3, the type of solvent component, and so forth, but is preferably from 0.1 to 10 wt %, and even more preferably 0.5 to 5 wt %, with respect to the total amount of the ink composition. Keeping this amount to 0.1 wt % or higher ensures satisfactory image density and coloration on the recording medium, and keeping the amount to 10 wt % or less makes it easier to regulate the viscosity of the ink composition and allows good discharge reliability, dogging resistance, and other such characteristics to be achieved more easily.

The ink composition of this embodiment contains at least one type of lithium salt of an aromatic compound having a specific sulfo group, in order to suppress the color change and fading seen when printing with an ink composition containing the above-mentioned phthalocyanine-based cyan dye (and which is caused by poor gas resistance, and particularly ozone resistance, on the part of the phthalocyanine-based cyan dye).

In this embodiment, this lithium salt of an aromatic compound having a specific sulfo group is used in combination with the above-mentioned phthalocyanine-based cyan dye, the result being that color change and fading in images caused by ozone gas are suppressed, and the fading resistance of an image is greatly enhanced, without causing any additive precipitation or bronzing The ink composition of this embodiment contains at least one type of lithium salt of an aromatic compound having a sulfo group and expressed by the following General Formulas 1 and/or 2, in order to alleviate or eliminate the color change and fading seen when printing with an ink composition containing the above-mentioned phthalocyanine-based cyan dye (and which seems to be caused by poor gas resistance, and particularly ozone resistance, on the part of the phthalocyanine-based cyan dye), without causing any additive precipitation or bronzing.

Exactly how the ink composition of this embodiment works is not clear, but it is believed that when a lithium salt of an aromatic compound having one or more sulfo groups is selectively used so that said compound will be expressed by the above-mentioned General Formulas 1 and/or 2, the water solubility of said aromatic compound is increased, and as a result, this prevents or suppresses the bronzing of a printed image and the precipitation of said aromatic compound onto the surface of the recording medium. This makes it possible to improve the gas resistance, and particularly the ozone resistance, of printed matter without incurring any problems.

With this embodiment, a lithium salt of an aromatic compound having a sulfo group and expressed by General Formulas 1 and/or 2 is used in combination with the above-mentioned phthalocyanine-based cyan dye, which markedly improves image fading resistance and suppresses color change and fading of an image caused by ozone gas, without causing any greening or blackening as a result of NOx gas, and also without causing any additive precipitation or bronzing.

Also, with this embodiment, if the ink composition contains water, the above-mentioned phthalocyanine-based cyan dye, and at least one type of lithium salt of an aromatic compound having the above-mentioned sulfo group, then the color change and fading seen in solid printing can be effectively prevented not only with a cyan ink composition, but also with ink compositions of different colors other than cyan, such as a black ink composition. Other conventional dyes can be used concurrently in order to produce these types of ink composition.

The details of lithium salt of an aromatic compound having a sulfo group and expressed by General Formulas 1 and/or 2 are the same as in the first embodiment above.

Just as in the first embodiment, the ink composition of this embodiment also preferably contains a humectant selected from among saccharides and/or water-soluble organic solvents whose evaporation pressure is lower than that of pure water, a nitrogen-containing organic solvent, a nonionic surfactant, and a penetration enhancer, the details of which are the same as in the first embodiment. In addition, the ink composition of this embodiment may contain, as needed, triethanolamine, a hydroxide of an alkali metal, or another such pH regulator, urea or a derivative thereof or another such hydrotropic agent, sodium alginate or another such water-soluble polymer, a water-soluble resin, a fluorine-based surfactant, a mildew inhibitor, a rustproofing agent, a preservative, or the like.

The method for preparing the ink composition in this embodiment is the same as in the first embodiment.

Fourth Embodiment

The ink composition pertaining to a fourth embodiment of the present invention is characterized by containing at least water, a phthalocyanine-based cyan dye, and an aromatic compound having a sulfo group and expressed by the following General Formulas 5 and/or 6, and/or a salt thereof, wherein the phthalocyanine-based cyan dye is expressed by the following Formula 3:

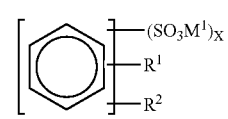
(5)

(where M$^1$ is a hydrogen atom or a counter ion that constitutes a salt, X is an integer of at least 3, R$^1$ and R$^2$ are each a hydrogen atom, a C$_1$ to C$_6$ alkyl group, or a C$_1$ to C$_6$ alkoxy group, and R$^1$ and R$^2$ may be the same or different)

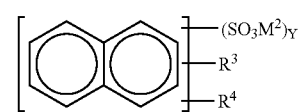
(6)

(where M$^2$ is a hydrogen atom or a counter ion that constitutes a salt, Y is an integer of at least 3, R$^3$ and R$^4$ are each a hydrogen atom, a $C_1$ to $C_6$ alkyl group, or a $C_1$ to $C_6$ alkoxy group, and $R^3$ and $R^4$ may be the same or different)

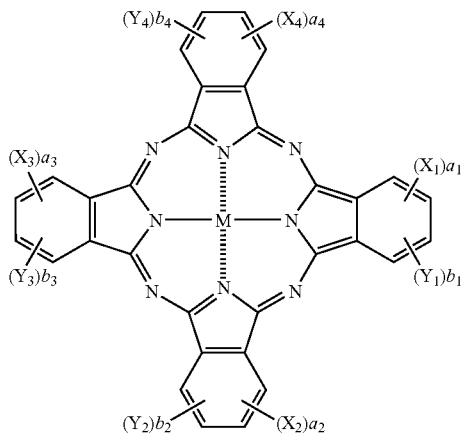

(3)

(where $X_1$, $X_2$, $X_3$, and $X_4$ are each independently —SO-Z or —SO$_2$-Z; each Z here is independently a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group, $Y_1$, $Y_2$, $Y_3$, and $Y_4$ are each independently a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureido group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, or ionic hydrophilic group, where each of these groups may have a substituent, $a_1$ to $a_4$ and $b_1$ to $b_4$ are the number of substituents of $X_1$ to $X_4$ and $Y_1$ to $Y_4$, respectively, $a_1$ to $a_4$ are each independently an integer from 0 to 4, but all cannot be 0 at the same time, and $b_1$ to $b_4$ are each independently an integer from 0 to 4, M is a hydrogen atom or a metal element or an oxide, hydroxide, or halide thereof, and at least one of $X_1$, $X_2$, $X_3$, $X_4$, $Y_1$, $Y_2$, $Y_3$, and $Y_4$ is an ionic hydrophilic group or a group that has an ionic hydrophilic group as a substituent).

Because the ink composition of the fourth embodiment is constituted as above, early fading of cyan images can be effectively prevented, without any additive precipitation occurring, and this in turn makes it possible for the indoor storage stability (gas resistance) of images produced from this ink composition to be increased without any problems.

The ink composition of the fourth embodiment contains, in water or an aqueous medium composed of water and a water-soluble organic solvent, at least a phthalocyanine-based cyan dye expressed by Formula 3 and an aromatic compound having a sulfo group and expressed by General Formulas 5 and/or 6, and/or a salt thereof, but can also contain a humectant, viscosity regulator, pH regulator, and other such additives as needed.

The cyan dye used in the ink composition of the fourth embodiment is the same as the cyan dye used in the ink composition of the third embodiment above. Therefore, the details pertaining to the cyan dye given in the third embodiment above also apply to the cyan dye in this embodiment.

The ink composition of this embodiment contains at least one type of a specific aromatic compound having three or more sulfo groups, and/or a salt thereof, in order to suppress the color change and fading seen when printing with an ink composition containing the above-mentioned phthalocyanine-based cyan dye (and which is caused by poor gas resistance, and particularly ozone resistance, on the part of the phthalocyanine-based cyan dye).

The result of using the above-mentioned phthalocyanine-based cyan dye together with this specific aromatic compound having three or more sulfo groups, and/or a salt thereof, is that color change and fading of an image caused by ozone gas is suppressed, without causing the problem of additive precipitation, and the fading resistance of the image is markedly increased.

The ink composition of this embodiment contains at least one type of aromatic compound having three or more sulfo groups and expressed by the following General Formulas 5 and/or 6, and/or a salt thereof, in order to alleviate or eliminate the color change and fading seen when printing with an ink composition containing a phthalocyanine-based cyan dye (and which seems to be caused by poor gas resistance, and particularly ozone resistance, on the part of the phthalocyanine-based cyan dye).

Exactly how the ink composition of this embodiment works is not clear, but it is believed that when an aromatic compound having a sulfo group, and/or a salt thereof, is selectively used so that said compound will have three or more sulfo groups and be expressed by the above-mentioned General Formulas 5 and/or 6, the water solubility of said aromatic compound is increased, and as a result, this prevents or suppresses the precipitation of said aromatic compound onto the surface of the recording medium. This makes it possible to improve the gas resistance, and particularly the ozone resistance, of printed matter without incurring any problems.

With this embodiment, an aromatic compound having three or more sulfo groups and expressed by General Formulas 5 and/or 6, and/or a salt thereof, is used in combination with a phthalocyanine-based cyan dye, which markedly improves image fading resistance and suppresses color change and fading of an image caused by ozone gas, without causing any greening or blackening as a result of NOx gas, and also without causing any additive precipitation.

Also, with this embodiment, if the ink composition contains water, the above-mentioned phthalocyanine-based cyan dye, and at least one type of aromatic compound having three or more sulfo groups, and/or a salt thereof, then the color change and fading seen in printing can be effectively prevented not only with a cyan ink composition, but also with ink compositions of different colors other than cyan, such as a black ink composition. Other conventional dyes can be used concurrently in order to produce these types of ink composition.

The details of the aromatic compound having three or more sulfo groups and expressed by General Formulas 5 and/or 6, and/or a salt thereof, are the same as in the second embodiment.

The pH of the ink composition in this embodiment, other additives (such as a humectant, a nitrogen-containing organic solvent, nonionic surfactant, or a penetration enhancer) and the amounts in which these are contained, and the method for preparing the ink composition are all the same as for the ink composition in the third embodiment above, and the particulars thereof are also suitably applied in this embodiment.

The present invention also provides an ink cartridge comprising at least the above-mentioned ink composition. The ink cartridge of the present invention facilitates handling (such as transportation) of an ink with which the indoor storage stability (gas resistance) of an image formed with said ink cartridge can be increased, and early color change and fading of images can be effectively prevented.

Next, the recording method of the present invention in which the above-mentioned ink composition is used will be described. The recording method of the present invention can be used to particular advantage in an inkjet recording system in which recording is accomplished by discharging an ink composition in the form of droplets from fine holes and causing these droplets to adhere to a recording medium, but it should go without saying that this method of the present invention can also be applied to ordinary writing instruments, recording meters, pen plotters, and so forth.

Any conventional inkjet recording system can be used, and in particular it is possible to perform excellent image recording in a method in which droplets are discharged by utilizing the vibration of piezoelectric elements (a recording method featuring an inkjet head that forms ink droplets by the mechanical deformation of electrostrictive elements), or a method that utilizes thermal energy.

The recorded matter of the present invention is the product of recording with the above-mentioned ink composition, has excellent indoor storage stability (gas resistance) of the formed images, without any additive precipitation or bronzing, and maintains good print quality over an extended period.

The present invention will now be described in detail through working examples, but the present invention is not limited to or by these examples.

WORKING EXAMPLES A

Working Examples 1 to 10 and Comparative Examples 1 to 4

The ink compositions of Working Examples 1 to 10 and Comparative Examples 1 to 4 were prepared by mixing and dissolving the various components in the proportions shown in Table 3, and filtering the mixture under pressure through a membrane filter with a pore diameter of 1 μm.

TABLE 3

| | | Working Example | | | | | | | | | | Comparative Ex. | | | |
|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 |
| Colorant | C.I. Direct Blue 199*[1] | 1 | 1 | 1.5 | 1.5 | 1.5 | 1 | 0.5 | 0.5 | 1 | 0.5 | 1 | 1 | 1 | 1 |
| Solvent, etc. | glycerol | 10 | 10 | 5 | 5 | 5 | 10 | 3 | 3 | | | 10 | 10 | 10 | |
| | triethylene glycol | 10 | 10 | 10 | 10 | 10 | 10 | 15 | 15 | 20 | 20 | 10 | 10 | 10 | 20 |
| | 2-pyrrolidone | | | 1 | 1 | 1 | 1 | 0.5 | 0.5 | 1 | 1 | | | | 1 |
| | triethanolamine | 1 | 1 | | | | | 0.5 | 0.5 | | | 1 | 1 | 1 | |
| | diethylene glycol monobutyl ether | | | 10 | 10 | 10 | 10 | | | | | | | | |
| | triethylene glycol monobutyl ether | 10 | 10 | | | | | 12 | 12 | 10 | 10 | 10 | 10 | 10 | 10 |
| | Olfine E1010*[2] | 1 | 1 | 1 | 1 | 1 | | 0.5 | 0.5 | | | 1 | 1 | 1 | |
| | Olfine PD001*[2] | | | | | | 1 | | | 1 | 1 | | | | 1 |
| | lithium hydroxide monohydrate | 1.1 | 0.5 | 1.35 | 0.65 | | 1.3 | 0.1 | 0.05 | 0.1 | 1.7 | | | | |
| | sodium hydroxide | | | | | 0.6 | | | | | | | 1.1 | 0.1 | |
| | potassium hydroxide | | | | | | | | | | | | | | 0.18 |
| Aromatic sulfonic acid | benzenesulfonic acid | | | | | 5 | | | | | | | | | |
| | benzene-1,3-disulfonic acid | | | | | | | 0.5 | | | | | | | |
| | naphthalene-1-sulfonic acid | | | | | | | | 0.3 | | | | | | |
| | naphthalene-1,5-disulfonic acid | 4 | 2 | | | | | | | | | | 4 | 0.4 | |
| | naphthalene-2,7-disulfonic acid | | | | | | | | | 0.5 | | | | | 0.5 |
| | naphthalene-1,3,6-trisulfonic acid | | | 4 | 2 | 2 | | | | | | | | | |
| | naphthalene-1,2,6-trisulfonic acid | | | | | | | | | | 5 | | | | |
| Preservative | Proxel XL-2*[3] | 0.3 | | 0.3 | 0.3 | 0.3 | 0.3 | 0.3 | 0.3 | 0.3 | 0.3 | 0.3 | | | 0.3 |
| Medium | Water | bal | bal | bal | bal | bal | bal | bal | bal | bal | bal | bal | bal | bal | bal |
| | Colorant to aromatic sulfonic acid ratio | 1:4 | 1:2 | 1:2.7 | 1:1.3 | 1:1.3 | 1:5 | 1:1 | 1:0.6 | 1:0.5 | 1:10 | — | 1:4 | 1:0.4 | 1:0.5 |

*[1]One having the absorption wavelength shown in FIG. 1 was used.
*[2]Made by Nissin Chemical.
*[3]Made by Avecia, Ltd.
[bal: balance]

The components of the ink compositions shown in Table 3 are given as the weight percentage of the components versus the total amount of the ink composition, with the balance being water.

The ink compositions of Working Examples 1 to 10 and Comparative Examples 1 to 4 were printed onto a dedicated inkjet recording medium (Premium Glossy Photo Paper made by Seiko-Epson) using an inkjet printer (EM930C made by Seiko-Epson) and the dedicated cartridge (cyan chamber) thereof, and the following evaluations were conducted.

Ozone Resistance Test

Using the above-mentioned cartridge, printing was performed with the printing duty adjusted so that the optical density (OD) would fall between 0.9 and 1.1, and the printed matter thus obtained was exposed for a specific length of time (6, 9, or 12 hours) with an ozone weather-o-meter model OMS-H (trade name of Suga Test Instruments), at a temperature of 24° C. a relative humidity of 60% and an ozone concentration of 10 ppm.

After this exposure, the OD of each printed matter was measured with a photographic densitometer (Spectrolino, made by Gretag), the residual optical density (ROD) was calculated from the following equation, and this was evaluated based on the following grading criteria.

ROD(%)=(D/D0)×100

D: OD after exposure test
D0: OD before exposure test
(Measurement conditions: red filter, D50 light source, 2-degree angle of visual field)

Grading Criteria
  A: ROD of at least 90%
  B: ROD of at least 80% and less than 90%
  C: ROD of at least 70% and less than 80%
  D: ROD of less than 70%

Additive Precipitation Test

Printing was performed at a printing duty of 100%, and the resulting printed matter was left in an environment of 25° C. and 50% RH for 2, 4, or 6 weeks.

After this period, the printed matter was observed visually to see whether or not any precipitation had occurred on the surface of the printed part.

Grading Criteria
  A: No precipitation
  B: There are portions that appear slightly white, but nothing that can clearly be identified as precipitate. This level poses no practical problem.
  C: The printed surface looks white, but the white substance cannot be identified as precipitate. This is a tolerable level.
  D: The printed surface is clearly white, and it is easy to see that precipitation has occurred.

Gloss of printed matter−gloss of recording medium

Grading Criteria
  A: less than 15
  B: at least 15, less than 35
  C: at least 35, less than 55
  D: at least 55

Clogging Test

An inkjet printer (EM-930C, made by Seiko-Epson) was filled with ink, printing was performed continuously for 10 minutes, it was confirmed that ink was being discharged from the nozzle, and then the printing was halted. The head was left uncapped for two weeks in an environment of 40° C. and 25% RH. At the end of the two weeks the nozzle was cleaned, after which printing was again performed. The dogging resistance of the ink was evaluated from how many times the nozzle could be cleaned so that the same printing as at the outset was possible, without any streaking, voids, or other such printing defects.

Grading Criteria
  A: When print that was the same as at the outset was obtained with 1 to 5 cleanings.
  B: When print that was the same as at the outset was obtained with 6 to 10 cleanings.
  C: When print that was the same as at the outset was obtained with 11 to 15 cleanings.
  D: When print that was the same as at the outset could not be obtained with 16 or more cleanings.

The evaluation results thus obtained are given in Table 4.

TABLE 4

|  |  | Ozone resistance | | | Additive precipitation | | | Bronzing | | Clogging |
|---|---|---|---|---|---|---|---|---|---|---|
|  |  | 6 hours | 9 hours | 12 hours | 2 weeks | 4 weeks | 6 weeks | 20° C., 55% RH | 32° C., 75% RH |  |
| Working Example | 1 | A | A | B | A | A | B | A | A | B |
|  | 2 | A | B | B | A | A | A | A | A | A |
|  | 3 | A | A | A | A | A | B | A | A | B |
|  | 4 | A | B | B | A | A | A | A | A | A |
|  | 5 | A | B | B | A | A | A | A | B | A |
|  | 6 | A | B | B | A | B | B | A | B | B |
|  | 7 | B | B | C | A | A | A | A | A | A |
|  | 8 | B | C | C | A | A | A | A | A | A |
|  | 9 | B | B | C | A | A | A | A | A | A |
|  | 10 | A | A | A | A | B | B | A | A | B |
| Comp. Example | 1 | B | D | D | A | A | A | A | A | A |
|  | 2 | A | A | B | A | C | D | C | D | B |
|  | 3 | B | C | D | A | A | A | A | B | A |
|  | 4 | B | B | C | B | C | D | C | D | B |

Bronzing

Printing was performed with the printing duty adjusted so that the imprinting was 1.5 to 2.2 mg per square inch, and the gloss of the resulting printed matter was measured (at a measurement angle of 60°) with a gloss meter (PG-1 M made by Nippon Denshoku). This printing was performed in two different environments: 20° C. and 55% RH, and 32° C. and 75% RH. The gloss value thus obtained and the value calculated from the following formula were used as grading criteria for bronzing.

Working Examples 11 to 18 and Comparative Examples 5 to 7

The ink compositions of Working Examples 11 to 18 and Comparative Examples 5 to 7 were prepared by mixing and dissolving the various components in the proportions shown in Table 5, and filtering the mixture under pressure through a membrane filter with a pore diameter of 1 μm.

TABLE 5

|  |  | Working Example |  |  |  |  |  |  |  | Comparative Ex. |  |  |
|---|---|---|---|---|---|---|---|---|---|---|---|---|
|  |  | 11 | 12 | 13 | 14 | 15 | 16 | 17 | 18 | 5 | 6 | 7 |
| Colorant | C.I. Direct Blue 199*4 | 1 | 1 | 1.5 | 1.5 | 0.5 | 0.5 | 1 | 1 | 1 | 1.5 | 1.5 |
| Solvent, | glycerol | 5 | 5 | 5 | 10 | 10 | 3 |  |  | 5 | 5 | 10 |
| etc. | triethylene glycol | 5 | 10 | 10 | 3 | 3 | 15 | 20 | 20 | 5 | 10 | 3 |
|  | 2-pyrrolidone |  | 1 | 1 | 2 | 2 |  |  |  |  | 1 | 2 |
|  | triethanolamine | 1 |  |  | 0.5 | 0.5 | 0.5 |  |  | 1 |  | 0.5 |
|  | diethylene glycol monobutyl ether |  |  |  | 8 | 8 |  |  |  |  |  | 8 |
|  | triethylene glycol monobutyl ether | 10 | 10 | 10 |  |  | 12 | 10 | 10 | 10 | 10 |  |
|  | Olfine E1010*5 |  | 1 | 1 |  |  | 0.5 |  |  |  | 1 |  |
|  | Olfine PD001*5 | 1 |  |  | 1 | 1 |  | 1 | 1 | 1 |  | 1 |
|  | lithium hydroxide monohydrate | 1.3 | 0.6 | 1.15 | 0.8 | 0.25 |  | 1.35 | 3.7 |  |  |  |
|  | sodium hydroxide |  |  |  |  |  | 0.1 |  |  |  | 0.1 |  |
|  | potassium hydroxide |  |  |  |  |  |  |  |  |  |  | 1.1 |
| Aromatic | benzene-1,4-disulfonic acid | 4 |  |  |  |  |  |  |  |  |  |  |
| sulfonic | naphthalene-2-sulfonic acid |  | 3 |  |  |  |  |  |  |  |  |  |
| acid | naphthalene-1,6-disulfonic acid |  |  | 4 |  |  |  |  |  |  | 0.4 |  |
|  | naphthalene-2,6-disulfonic acid |  |  |  | 3 |  |  |  |  |  |  | 3 |
|  | naphthalene-1,3,5-trisulfonic acid |  |  |  |  | 1 |  |  |  |  |  |  |
|  | naphthalene-1,3,7-trisulfonic acid |  |  |  |  |  | 0.5 |  |  |  |  |  |
|  | naphthalene-1,4,6-trisulfonic acid |  |  |  |  |  |  | 4 |  |  |  |  |
|  | naphthalene-1,3,5,7-tetrasulfonic acid |  |  |  |  |  |  |  | 10 |  |  |  |
| Preservative | Proxel XL-2*6 | 0.3 | 0.3 | 0.3 | 0.3 | 0.3 | 0.3 | 0.3 | 0.3 | 0.3 | 0.3 | 0.3 |
| Medium | Water | bal | bal | bal | bal | bal | bal | bal | bal | bal | bal | bal |
|  | Colorant to aromatic sulfonic acid ratio | 1:4 | 1:3 | 1:2.7 | 1:2 | 1:2 | 1:1 | 1:4 | 1:10 | — | 1:0.4 | 1:2 |

*4One having the absorption wavelength shown in FIG. 1 was used.
*5Made by Nissin Chemical.
*6Made by Avecia, Ltd.
[bal: balance]

The components of the ink compositions shown in Table 5 are given as the weight percentage of the components versus the total amount of the ink composition, with the balance being water.

The ink compositions of Working Examples 11 to 18 and Comparative Examples 5 to 7 were printed by the same method as in Working Examples 1 to 10, and the following evaluations were conducted.

Ozone Resistance Test

Except that the ozone concentration was changed to 2 ppm, ozone exposure was carried out by the same method as in Working Examples 1 to 10.

After this exposure, the OD of each printed matter was measured with a photographic densitometer (Spectrolino, made by Gretag), the residual optical density (ROD) was calculated, and this was evaluated based on the following grading criteria.

Grading Criteria
A: ROD of at least 90%
B: ROD of at least 80% and less than 90%
C: ROD of at least 70% and less than 80%
D: ROD of less than 70%

Additive Precipitation Test

The ink compositions of Working Examples 11 to 18 and Comparative Examples 5 to 7 were subjected to an additive precipitation test by the same method as in Working Examples 1 to 10, and were evaluated by the same grading criteria.

Bronzing

The ink compositions of Working Examples 11 to 18 and Comparative Examples 5 to 7 were subjected to a bronzing test by the same method as in Working Examples 1 to 10, and were evaluated by the same grading criteria.

Clogging Test

The ink compositions of Working Examples 11 to 18 and Comparative Examples 5 to 7 were subjected to a dogging test by the same method as in Working Examples 1 to 10, and were evaluated by the same grading criteria.

The evaluation results thus obtained are given in Table 6.

TABLE 6

|  |  | Ozone resistance | | | Additive precipitation | | | Bronzing | | |
|---|---|---|---|---|---|---|---|---|---|---|
|  |  | 6 hours | 9 hours | 12 hours | 2 weeks | 4 weeks | 6 weeks | 20° C., 55% RH | 32° C., 75% RH | Clogging |
| Working Example | 11 | A | B | B | A | A | B | A | A | B |
|  | 12 | A | B | C | A | A | B | A | A | A |
|  | 13 | A | A | B | A | A | B | A | A | B |
|  | 14 | A | B | B | A | A | A | A | A | B |
|  | 15 | A | B | B | A | A | A | A | A | A |
|  | 16 | A | B | B | A | A | A | A | B | A |
|  | 17 | A | A | A | A | A | B | A | A | B |
|  | 18 | A | A | A | A | B | B | A | A | C |

TABLE 6-continued

|  |  | Ozone resistance | | | Additive precipitation | | | Bronzing | | |
|---|---|---|---|---|---|---|---|---|---|---|
|  |  | 6 hours | 9 hours | 12 hours | 2 weeks | 4 weeks | 6 weeks | 20° C., 55% RH | 32° C., 75% RH | Clogging |
| Comp. Example | 5 | C | D | D | A | A | A | A | A | A |
|  | 6 | B | C | D | A | A | A | A | B | A |
|  | 7 | A | A | B | B | C | D | C | D | B |

WORKING EXAMPLES B

Working Examples 1 to 14 and Comparative Examples 1 to 4

The ink compositions of Working Examples 1 to 14 and Comparative Examples 1 to 4 were prepared by mixing and dissolving the various components in the proportions shown in Table 7, and filtering the mixture under pressure through a membrane filter with a pore diameter of 1 μm.

TABLE 7

|  |  | Working Example | | | | | | | | |
|---|---|---|---|---|---|---|---|---|---|---|
|  |  | 1 | 2 | 3 | 4 | 5 | 6 | 7 | 8 | 9 |
| Colorant | Compound A in Table 4 | 1 |  | 1 |  |  |  |  |  |  |
|  | Compound B in Table 4 |  | 1 |  |  |  |  |  |  |  |
|  | Compound C in Table 4 |  |  |  | 1.5 |  | 1.5 |  |  |  |
|  | Compound D in Table 4 |  |  |  |  | 1.5 |  |  |  |  |
|  | Compound E in Table 4 |  |  |  |  |  |  | 1.5 |  |  |
|  | Compound F in Table 5 |  |  |  |  |  |  |  | 1 |  |
|  | Compound G in Table 5 |  |  |  |  |  |  |  |  | 1 |
|  | Compound H in Table 5 |  |  |  |  |  |  |  |  |  |
|  | Compound I in Table 5 |  |  |  |  |  |  |  |  |  |
|  | Compound J in Table 5 |  |  |  |  |  |  |  |  |  |
|  | Compound K in Table 5 |  |  |  |  |  |  |  |  |  |
| Solvent, etc. | glycerol | 10 | 10 | 10 | 5 | 5 | 5 | 5 | 10 | 10 |
|  | triethylene glycol | 10 | 10 | 10 | 10 | 10 | 10 | 10 | 10 | 10 |
|  | 2-pyrrolidone |  |  |  | 1 | 1 | 1 | 1 | 1 | 1 |
|  | triethanolamine | 1 | 1 | 1 |  |  |  |  | 0.5 | 0.5 |
|  | diethylene glycol monobutyl ether |  |  |  | 10 | 10 | 10 |  |  |  |
|  | triethylene glycol monobutyl ether | 10 | 10 | 10 |  |  |  | 10 | 10 | 10 |
|  | Olfine E1010*[1] | 1 | 1 | 1 | 1 | 1 | 1 | 1 |  |  |
|  | Olfine PD001*[1] |  |  |  |  |  |  |  | 1 | 1 |
|  | lithium hydroxide monohydrate | 3.7 | 0.8 | 0.25 | 1.35 | 1 | 0.65 |  | 1.25 | 1.4 |
|  | sodium hydroxide |  |  |  |  |  |  | 1.6 |  |  |
|  | potassium hydroxide |  |  |  |  |  |  |  |  |  |
| Aromatic Sulfonic acid | benzenesulfonic acid |  |  |  |  |  |  |  | 5 |  |
|  | benzene-1,3-disulfonic acid |  |  |  |  |  |  |  |  |  |
|  | naphthalene-1-sulfonic acid |  |  |  |  |  |  |  |  |  |
|  | naphthalene-1,5-disulfonic acid | 4 |  | 2 |  |  |  |  |  |  |
|  | naphthalene-2,6-disulfonic acid |  | 3 |  |  |  |  |  |  |  |
|  | naphthalene-2,7-disulfonic acid |  |  |  |  |  |  |  |  | 5 |
|  | naphthalene-1,3,6-trisulfonic acid |  |  |  | 4 |  | 2 |  |  |  |
|  | naphthalene-1,4,6-trisulfonic acid |  |  |  |  | 3 |  |  |  |  |
|  | naphthalene-1,2,6-trisulfonic acid |  |  |  |  |  |  |  | 5 |  |
|  | naphthalene-1,3,5,7-trisulfonic acid |  |  |  |  |  |  |  |  |  |
| Preserv. | Proxel XL-2*[2] | 0.3 |  | 0.3 | 0.3 | 0.3 | 0.3 | 0.3 | 0.3 | 0.3 |
| Medium | Water | bal | bal | bal | bal | bal | bal | bal | bal | bal |

TABLE 7-continued

| | Colorant to aromatic sulfonic acid ratio | 1:4 | 1:3 | 1:2 | 1:2.7 | 1:2 | 1:1.3 | 1:3.5 | 1:5 | 1:5 |
|---|---|---|---|---|---|---|---|---|---|---|
| | | \multicolumn{5}{c}{Working Example} | | | Comparative Ex. | | |
| | | 10 | 11 | 12 | 13 | 14 | 1 | 2 | 3 | 4 |
| Colorant | Compound A in Table 4 | | | | | | 1 | 1 | | |
| | Compound B in Table 4 | | | | | | | | 1 | |
| | Compound C in Table 4 | | | | | | | | | 1.5 |
| | Compound D in Table 4 | | | | | | | | | |
| | Compound E in Table 4 | | | | | | | | | |
| | Compound F in Table 5 | | | | | | | | | |
| | Compound G in Table 5 | | | | | | | | | |
| | Compound H in Table 5 | 0.5 | | | | | | | | |
| | Compound I in Table 5 | | 0.5 | | | | | | | |
| | Compound J in Table 5 | | | 1 | | | | | | |
| | Compound K in Table 5 | | | | 0.5 | 1 | | | | |
| Solvent, etc. | glycerol | 3 | 3 | | | | 10 | 10 | 10 | 5 |
| | triethylene glycol | 15 | 15 | 20 | 20 | 20 | 10 | 10 | 10 | 10 |
| | 2-pyrrolidone | 0.5 | 0.5 | 1 | 1 | 1 | | | | 1 |
| | triethanolamine | 0.5 | 0.5 | | | | 1 | 1 | 1 | |
| | diethylene glycol monobutyl ether | | | | | | | | | 10 |
| | triethylene glycol monobutyl ether | 12 | 12 | 10 | 10 | 10 | 10 | 10 | 10 | |
| | Olfine E1010*[1] | 0.5 | 0.5 | | | | 1 | 1 | 1 | 1 |
| | Olfine PD001*[1] | | | 1 | 1 | 1 | | | | |
| | lithium hydroxide monohydrate | 0.15 | 0.06 | 0.15 | 0.65 | 3.7 | | | | |
| | sodium hydroxide | | | | | | | 1.1 | 0.1 | |
| | potassium hydroxide | | | | | | | | | 1.9 |
| Aromatic Sulfonic acid | benzenesulfonic acid | | | | | | | | | |
| | benezene-1,3-disulfonic acid | 0.5 | | | | | | | | |
| | naphthalene-1-sulfonic acid | | 0.3 | | | | | | | |
| | naphthalene-1,5-disulfonic acid | | | | | | | 4 | | |
| | naphthalene-2,6-disulfonic acid | | | | | | | | 0.4 | |
| | naphthalene-2,7-disulfonic acid | | | 0.5 | | | | | | 5 |
| | naphthalene-1,3,6-trisulfonic acid | | | | | | | | | |
| | naphthalene-1,4,6-trisulfonic acid | | | | | | | | | |
| | naphthalene-1,2,6-trisulfonic acid | | | | 2 | | | | | |
| | naphthalene-1,3,5,7-trisulfonic acid | | | | | 10 | | | | |
| Preserv. | Proxel XL-2*[2] | 0.3 | 0.3 | 0.3 | 0.3 | 0.3 | 0.3 | 0.3 | | 0.3 |
| Medium | Water | bal | bal | bal | bal | bal | bal | bal | bal | bal |
| | Colorant to aromatic sulfonic acid ratio | 1:1 | 1:0.6 | 1:0.5 | 1:4 | 1:10 | — | 1:4 | 1:0.4 | 1:3.3 |

*[1]Made by Nissin Chemical.
*[2]Made by Avecia, Ltd.
[bal: balance]

TABLE 8

| | | \multicolumn{4}{c}{In General Formula 4:} | | | |
|---|---|---|---|---|---|
| | M | $Z_1$ | $Z_2$ | $Z_3$ | $Z_4$ |
| Compound A | Cu | —$(CH_2)_3SO_3Na$ | —$(CH_2)_3SO_3Na$ | —$(CH_2)_3SO_3Na$ | —$(CH_2)_3SO_3Na$ |
| Compound B | Cu | —$(CH_2)_3SO_3Li$ | —$(CH_2)_3SO_3Li$ | —$(CH_2)_3SO_3Li$ | —$(CH_2)_3SO_3Li$ |
| Compound C | Cu | —$(CH_2)_3CO_2K$ | —$(CH_2)_3CO_2K$ | —$(CH_2)_3CO_2K$ | —$(CH_2)_3CO_2K$ |
| Compound D | Cu | —$CH_2CH(OH)CH_2SO_3Li$ | —$CH_2CH(OH)CH_2SO_3Li$ | —$CH_2CH(OH)CH_2SO_3Li$ | —$CH_2CH(OH)CH_2SO_3Li$ |
| Compound E | Cu | —$(CH_2)_2CH(CH_3)SO_3Li$ | —$(CH_2)_2CH(CH_3)SO_3Li$ | —$(CH_2)_2CH(CH_3)SO_3Li$ | —$(CH_2)_2CH(CH_3)SO_3Li$ |

TABLE 9

In General Formula 7:

| | M | $R_1$ | n | $R_2$ | m |
|---|---|---|---|---|---|
| Compound F | Cu | —$(CH_2)_3SO_3Li$ | 3 | —$(CH_2)_3SO_2NHCH_2CH(OH)CH_3$ | 1 |
| Compound G | Cu | —$(CH_2)_3SO_3Li$ | 2 | —$(CH_2)_3SO_2NHCH_2CH(OH)CH_3$ | 2 |
| Compound H | Cu | —$(CH_2)_3SO_3Li$ | 3 | —$(CH_2)_3SO_2NHCH(CH_3)CH_2OH$ | 1 |
| Compound I | Cu | —$(CH_2)_3SO_3Li$ | 2 | —$(CH_2)_3SO_2NHCH(CH_3)CH_2OH$ | 2 |
| Compound J | Cu | —$(CH_2)_3SO_3Li$ | 3 | —$(CH_2)_3SO_2N(C_2H_4OH)_2$ | 1 |
| Compound K | Cu | —$(CH_2)_3SO_3Li$ | 3 | —$(CH_2)_3CO_2Li$ | 1 |

The components of the ink compositions shown in Table 7 are given as the weight percentage of the components versus the total amount of the ink composition, with the balance being water.

The ink compositions of Working Examples 1 to 14 and Comparative Examples 1 to 4 were printed onto a dedicated inkjet recording medium (Premium Glossy Photo Paper made by Seiko-Epson) using an inkjet printer (EM-930C made by Seiko-Epson) and the dedicated cartridge (cyan chamber) thereof, and an ozone resistance test, additive precipitation test, bronzing test, and clogging test were conducted and evaluations made in the same manner as above. In the ozone resistance test, everything was conducted in the same manner as above except that the ozone concentration was changed from 10 ppm to 20 ppm, and the printed matter was exposed for 12, 18, or 24 hours.

These results are given in Table 10.

TABLE 10

| | | Ozone resistance | | | Additive precipitation | | | Bronzing | | |
| | | 12 hours | 18 hours | 24 hours | 2 weeks | 4 weeks | 6 weeks | 20° C., 55% RH | 32° C., 75% RH | Clogging |
|---|---|---|---|---|---|---|---|---|---|---|
| Working Example | 1 | A | B | B | A | A | B | B | C | B |
| | 2 | A | B | B | A | A | B | A | B | A |
| | 3 | B | B | C | A | A | A | A | C | A |
| | 4 | A | A | B | A | A | B | A | C | B |
| | 5 | A | B | B | A | A | A | A | C | B |
| | 6 | A | B | C | A | A | A | A | B | A |
| | 7 | A | A | B | A | B | B | A | B | B |
| | 8 | A | B | B | B | B | C | A | B | B |
| | 9 | A | A | A | B | B | C | B | C | B |
| | 10 | B | B | C | A | A | A | B | C | A |
| | 11 | B | C | C | A | A | A | B | C | A |
| | 12 | B | C | C | A | A | A | A | C | A |
| | 13 | A | B | C | A | A | B | A | B | A |
| | 14 | A | B | B | A | A | B | A | C | C |
| Comp. Example | 1 | C | D | D | A | A | A | B | C | A |
| | 2 | A | B | B | B | C | D | B | D | B |
| | 3 | B | C | D | A | A | B | B | C | A |
| | 4 | A | A | A | B | C | D | B | D | B |

The present invention is an ink composition containing a phthalocyanine-based cyan dye, with which the indoor storage stability (gas resistance) of an image formed from said ink composition can be increased and the early color change and fading of images can be effectively prevented, without causing any additive precipitation or bronzing. The present invention can also be utilized industrially as an ink cartridge, and inkjet recording method, and recorded matter in which this ink composition is used.

We claim:

1. An ink composition containing at least water, a phthalocyanine-based cyan dye, and a lithium salt of an aromatic compound having a sulfo group and expressed by the following General Formulas 1 and/or 2:

(1)

where X is an integer of at least 1, $R^1$ and $R^2$ are each a hydrogen atom, a $C_1$ to $C_6$ alkyl group, or a $C_1$ to $C_6$ alkoxy group, and $R^1$ and $R^2$ may be the same or different

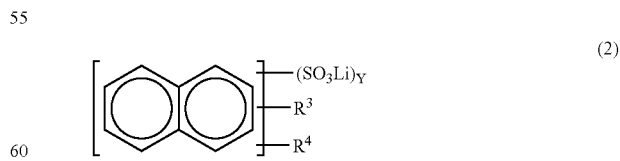

(2)

where Y is an integer of at least 1, $R^3$ and $R^4$ are each a hydrogen atom, a $C_1$ to $C_6$ alkyl group, or a $C_1$ to $C_6$ alkoxy group, and $R^3$ and $R^4$ may be the same or different.

2. The ink composition according to claim 1, wherein the phthalocyanine-based cyan dye is a copper phthalocyanine dye expressed by the following Formula 0:

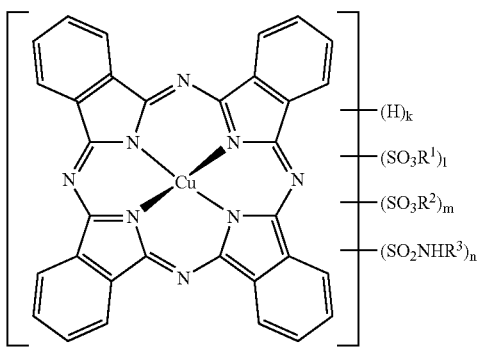

(0)

where $R^1$ is a hydrogen, alkali metal, or —$NH_4$, $R^2$ is an alkali metal or —$NH_4$, $R^3$ is a hydrogen, an alkyl group that may be substituted, or an aryl group that may be substituted, k, l, and n are each 0 to 3, m is a natural number from 1 to 4, and k+l+m+n=4.

3. The ink composition according to claim 2, wherein the copper phthalocyanine dye is C.I. Direct Blue 86, 87 and/or 199.

4. The ink composition according to claim 1, wherein the lithium salt of an aromatic compound having a sulfo group has two or more sulfo groups.

5. The ink composition according to claim 1, wherein the phthalocyanine-based cyan dye has a group that includes a lithium ion as a counter ion.

6. The ink composition according to claim 4, wherein the lithium salt of an aromatic compound having a sulfo group is at least one type selected from the group consisting of lithium salts of 1,3-benzenedisulfonic acid, napthalene-1,5-disulfonic acid, napthalene-1,6-disulfonic acid, napthalene-2,6-disulfonic acid, napthalene-2,7-disulfonic acid, and napthalene-1,3,6-trisulfonic acid.

7. The ink composition according to claim 1, wherein the lithium salt of an aromatic compound having a sulfo group is contained in an amount of 0.1 to 10 wt % with respect to the total amount of the ink composition.

8. The ink composition according to claim 1, wherein the phthalocyanine-based cyan dye and the lithium salt of an aromatic compound having a sulfo group are contained in a proportion of from 1:0.1 to 1:10.

9. An ink composition containing at least water, a phthalocyanine-based cyan dye, and an aromatic compound having a sulfo group and expressed by the following General Formulas 5 and/or 6, or a lithium salt of said aromatic compound:

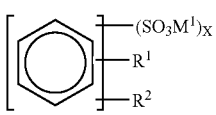

(5)

where $M^1$ is a hydrogen atom or a lithium counter ion that constitutes a salt, X is an integer of at least 3, $R^1$ and $R^2$ are each a hydrogen atom, a $C_1$ to $C_6$ alkyl group, or a $C_1$ to $C_6$ alkoxy group, and $R^1$ and $R^2$ may be the same or different

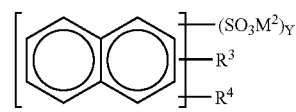

(6)

where $M^2$ is a hydrogen atom or a lithium counter ion that constitutes a salt, Y is an integer of at least 3, $R^3$ and $R^4$ are each a hydrogen atom, a $C_1$ to $C_6$ alkyl group, or a $C_1$ to $C_6$ alkoxy group, and $R^3$ and $R^4$ may be the same or different.

10. The ink composition according to claim 9, wherein the phthalocyanine-based cyan dye is a copper phthalocyanine dye expressed by the following Formula 0:

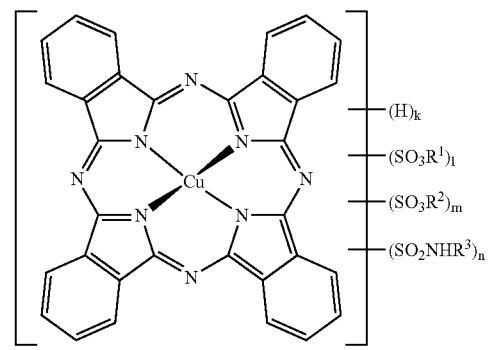

(0)

where $R^1$ is a hydrogen, alkali metal, or —$NH_4$, $R^2$ is an alkali metal or —$NH_4$, $R^3$ is a hydrogen, an alkyl group that may be substituted, or an aryl group that may be substituted, k, l, and n are each 0 to 3, m is a natural number from 1 to 4, and k+l+m+n=4.

11. The ink composition according to claim 10, wherein the copper phthalocyanine dye is C.I. Direct Blue 86, 87 and/or 199.

12. The ink composition according to claim 9, wherein the aromatic compound having a sulfo group and/or a lithium salt thereof is at least one type selected from the group consisting of naphthalene-1,3,5-trisulfonic acid, naphthalene-1,3,6-trisulfonic acid, naphthalene-1,3,7-trisulfonic acid, naphthalene-1,4,6-trisulfonic acid, naphthalene-1,4,7-trisulfonic acid, and lithium salts thereof.

13. The ink composition according to claim 9, wherein the aromatic compound having a sulfo group is a lithium salt.

14. The ink composition according to claim 9, wherein the aromatic compound having a sulfo group and/or a salt thereof is contained in an amount of 0.1 to 10 wt % with respect to the total amount of the ink composition.

15. The ink composition according to claim 9, wherein the phthalocyanine-based cyan dye and the aromatic compound having a sulfo group and/or a salt thereof are contained in a proportion of from 1:0.1 to 1:10.

16. The ink composition according to claim 1, wherein the phthalocyanine-based cyan dye is one in which the absorption spectrum in the visible band (400 to 800 nm) has a maximum absorption peak at a wavelength of 590 to 650 nm.

17. The ink composition according to claim 1, wherein the phthalocyanine-based cyan dye is one in which the absorption spectrum in the visible band (400 to 800 nm) has a maximum absorption peak at a wavelength of 590 to 615 nm.

18. The ink composition according to claim 1, wherein the phthalocyanine-based cyan dye is one in which the absorption spectrum in the visible band (400 to 800 nm) has a maximum absorption peak at a wavelength of 590 to 605 nm.

19. An ink composition containing at least water, a phthalocyanine-based cyan dye, and a lithium salt of an aromatic compound having a sulfo group and expressed by the following General Formulas 1 and/or 2, wherein the phthalocyanine-based cyan dye is expressed by the following Formula 3:

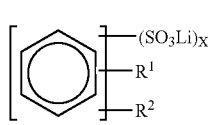
(1)

where X is an integer of at least 1, $R^1$ and $R^2$ are each a hydrogen atom, a $C_1$ to $C_6$ alkyl group, or a $C_1$ to $C_6$ alkoxy group, and $R^1$ and $R^2$ may be the same or different

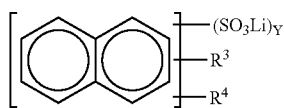
(2)

where Y is an integer of at least 1, $R^3$ and $R^4$ are each a hydrogen atom, a $C_1$ to $C_6$ alkyl group, or a $C_1$ to $C_6$ alkoxy group, and $R^3$ and $R^4$ may be the same or different.

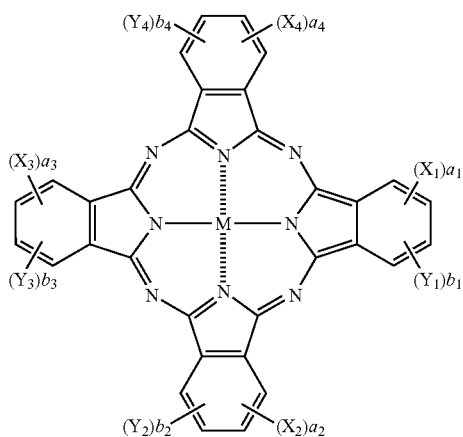
(3)

where $X_1$, $X_2$, $X_3$, and $X_4$ are each independently —SO-Z or —$SO_2$-Z; each Z here is independently a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group, $Y_1$, $Y_2$, $Y_3$, and $Y_4$ are each independently a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureido group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, or ionic hydrophilic group, where each of these groups may have a substituent, $a_1$ to $a_4$ and $b_1$ to $b_4$ are the number of substituents of $X_1$ to $X_4$ and $Y_1$ to $Y_4$, respectively, $a_1$ to $a_4$ are each independently an integer from 0 to 4, but all cannot be 0 at the same time, and $b_1$ to $b_4$ are each independently an integer from 0 to 4, M is a hydrogen atom or a metal element or an oxide, hydroxide, or halide thereof, and at least one of $X_1$, $X_2$, $X_3$, $X_4$, $Y_1$, $Y_2$, $Y_3$, and $Y_4$ is an ionic hydrophilic group or a group that has an ionic hydrophilic group as a substituent.

20. The ink composition according to claim 19, wherein the phthalocyanine-based cyan dye expressed by Formula 3 is a phthalocyanine dye expressed by the following Formula 4:

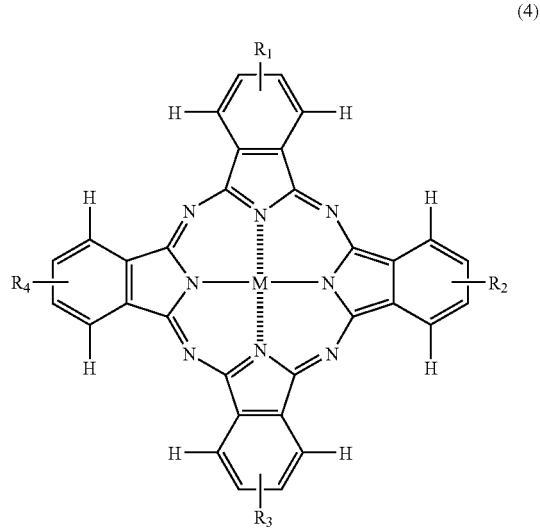
(4)

where M is defined the same as in General Formula 3, $R_1$ to $R_4$ are each independently —$SO_2Z$, Z here is defined the same as in General Formula 3, and of the four Z groups, at least one has an ionic hydrophilic group as a substituent.

21. The ink composition according to claim 19, wherein the lithium salt of an aromatic compound having a sulfo group has two or more sulfo groups.

22. The ink composition according to claim 19, wherein the phthalocyanine-based cyan dye has a group that includes a lithium ion as a counter ion.

23. The ink composition according to claim 21, wherein the lithium salt of an aromatic compound having a sulfo group is at least one type selected from the group consisting of lithium salts of 1,3-benzenedisulfonic acid, napthalene-1,5-disulfonic acid, napthalene-1,6-disulfonic acid, napthalene-2,6-disulfonic acid, napthalene-2,7-disulfonic acid, and napthalene-1,3,6-trisulfonic acid.

24. The ink composition according to claim 19, wherein the lithium salt of an aromatic compound having a sulfo group is contained in an amount of 0.1 to 10 wt % with respect to the total amount of the ink composition.

25. The ink composition according to claim 19, wherein the phthalocyanine-based cyan dye and the lithium salt of an aromatic compound having a sulfo group are contained in a proportion of from 1:0.1 to 1:10.

26. An ink composition containing at least water, a phthalocyanine-based cyan dye, and an aromatic compound having a sulfo group and expressed by the following General Formulas 5 and/or 6, and/or a salt of said aromatic compound, wherein the phthalocyanine-based cyan dye is expressed by the following Formula 3:

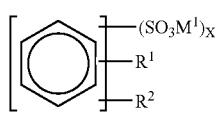

(5)

where $M^1$ is a hydrogen atom or a counter ion that constitutes a salt, X is an integer of at least 3, $R^1$ and $R^2$ are each a hydrogen atom, a $C_1$ to $C_6$ alkyl group, or a $C_1$ to $C_6$ alkoxy group, and $R^1$ and $R^2$ may be the same or different

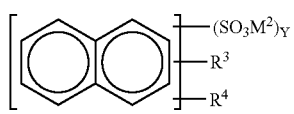

(6)

where $M^2$ is a hydrogen atom or a counter ion that constitutes a salt, Y is an integer of at least 3, $R^3$ and $R^4$ are each a hydrogen atom, a $C_1$ to $C_6$ alkyl group, or a $C_1$ to $C_6$ alkoxy group, and $R^3$ and $R^4$ may be the same or different.

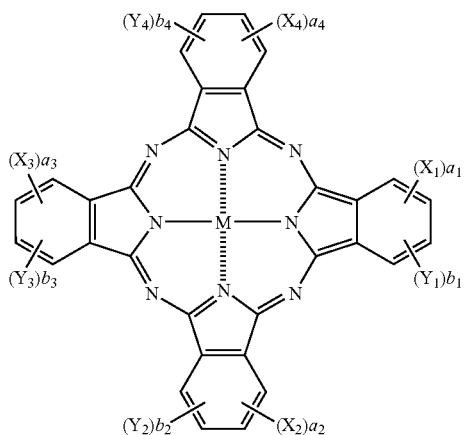

(3)

where $X_1$, $X_2$, $X_3$, and $X_4$ are each independently —SO-Z or —$SO_2$-Z; each Z here is independently a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group, $Y_1$, $Y_2$, $Y_3$, and $Y_4$ are each independently a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureido group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, or ionic hydrophilic group, where each of these groups may have a substituent, $a_1$ to $a_4$ and $b_1$ to $b_4$ are the number of substituents of $X_1$ to $X_4$ and $Y_1$ to $Y_4$, respectively, $a_1$ to $a_4$ are each independently an integer from 0 to 4, but all cannot be 0 at the same time, and $b_1$ to $b_4$ are each independently an integer from 0 to 4, M is a hydrogen atom or a metal element or an oxide, hydroxide, or halide thereof, and at least one of $X_1$, $X_2$, $X_3$, $X_4$, $Y_1$, $Y_2$, $Y_3$, and $Y_4$ is an ionic hydrophilic group or a group that has an ionic hydrophilic group as a substituent.

27. The ink composition according to claim 26, wherein the phthalocyanine-based cyan dye expressed by Formula 3 is a phthalocyanine dye expressed by the following Formula 4:

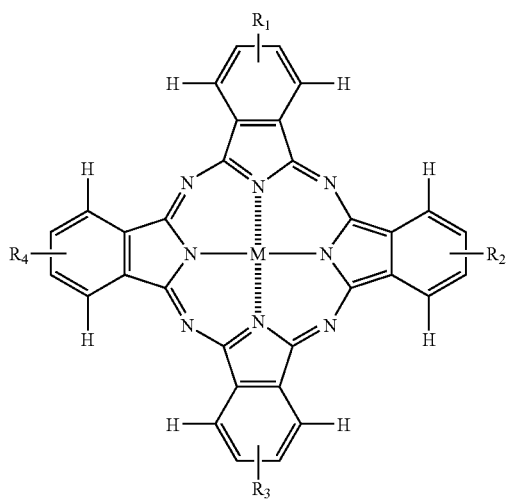

(4)

where M is defined the same as in General Formula 3, $R_1$ to $R_4$ are each independently —$SO_2Z$, Z here is defined the same as in General Formula 3, and of the four Z groups, at least one has an ionic hydrophilic group as a substituent.

28. The ink composition according to claim 26, wherein the aromatic compound having a sulfo group and/or a salt thereof is at least one type selected from the group consisting of naphthalene-1,3,5-trisulfonic acid, naphthalene-1,3,6-trisulfonic acid, naphthalene-1,3,7-trisulfonic acid, naphthalene-1,4,6-trisulfonic acid, naphthalene-1,4,7-trisulfonic acid, and salts thereof.

29. The ink composition according to claim 26, wherein the salt of an aromatic compound having a sulfo group is an alkali metal salt.

30. The ink composition according to claim 29, wherein the salt of an aromatic compound having a sulfo group is a lithium salt.

31. The ink composition according to claim 26, wherein the aromatic compound having a sulfo group and/or a salt thereof is contained in an amount of 0.1 to 10 wt % with respect to the total amount of the ink composition.

32. The ink composition according to claim 26, wherein the phthalocyanine-based cyan dye and the aromatic compound having a sulfo group and/or a salt thereof are contained in a proportion of from 1:0.1 to 1:10.

33. The ink composition according to claim 1, further containing a nonionic surfactant.

34. The ink composition according to claim 33, wherein the nonionic surfactant is an acetylene glycol-based surfactant.

35. The ink composition according to claim 33, wherein the nonionic surfactant is contained in an amount of 0.1 to 5 wt % with respect to the total amount of the ink composition.

36. The ink composition according to claim 1, further containing an penetration enhancer.

37. The ink composition according to claim 36, wherein the penetration enhancer is a glycol ether.

38. The ink composition according to claim 1, wherein the pH of the ink composition at 20° C. is from 8.0 to 10.5.

39. An inkjet recording method comprising (a) providing the ink composition according to claim 9; and (b) depositing droplets of the ink composition onto a recording medium.

40. The ink composition according to claim 39, wherein an inkjet head forms the ink droplets for depositing onto the recording medium by the mechanical deformation of electrostrictive elements.

41. An ink cartridge, comprising at least the ink composition according to claim 1.

42. An inkjet recording method for recording comprising providing the ink composition of claim 1, and discharging droplets of the ink composition and causing said droplets to adhere to a recording medium.

43. A recorded matter, which is recorded by the method according to claim 42.

* * * * *